June 9, 1964
D. M. INGHRAM
3,136,433
CARGO HANDLING APPARATUS
Filed May 12, 1961
16 Sheets-Sheet 1
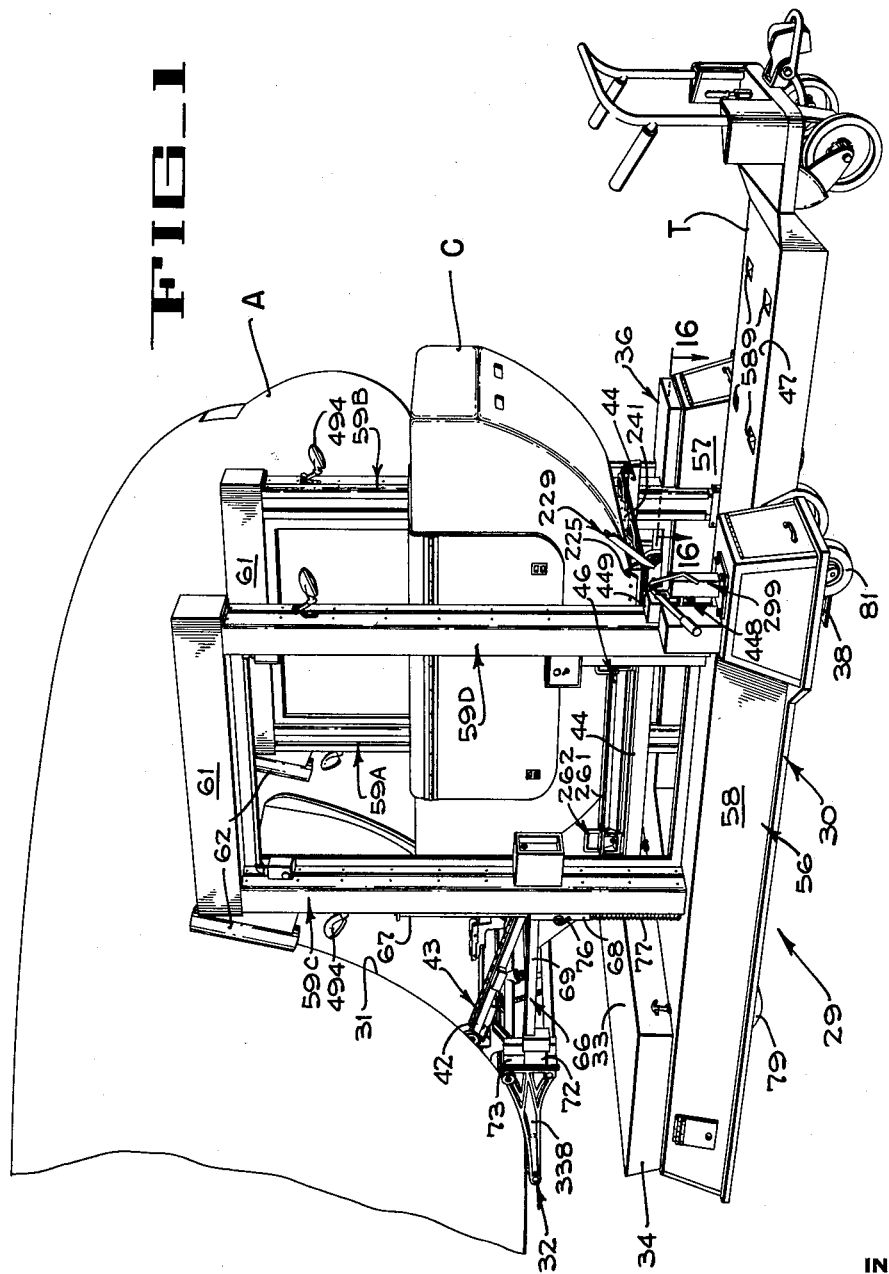
INVENTOR
DONALD M. INGHRAM
BY Hans G. Hoffmeister
ATTORNEY

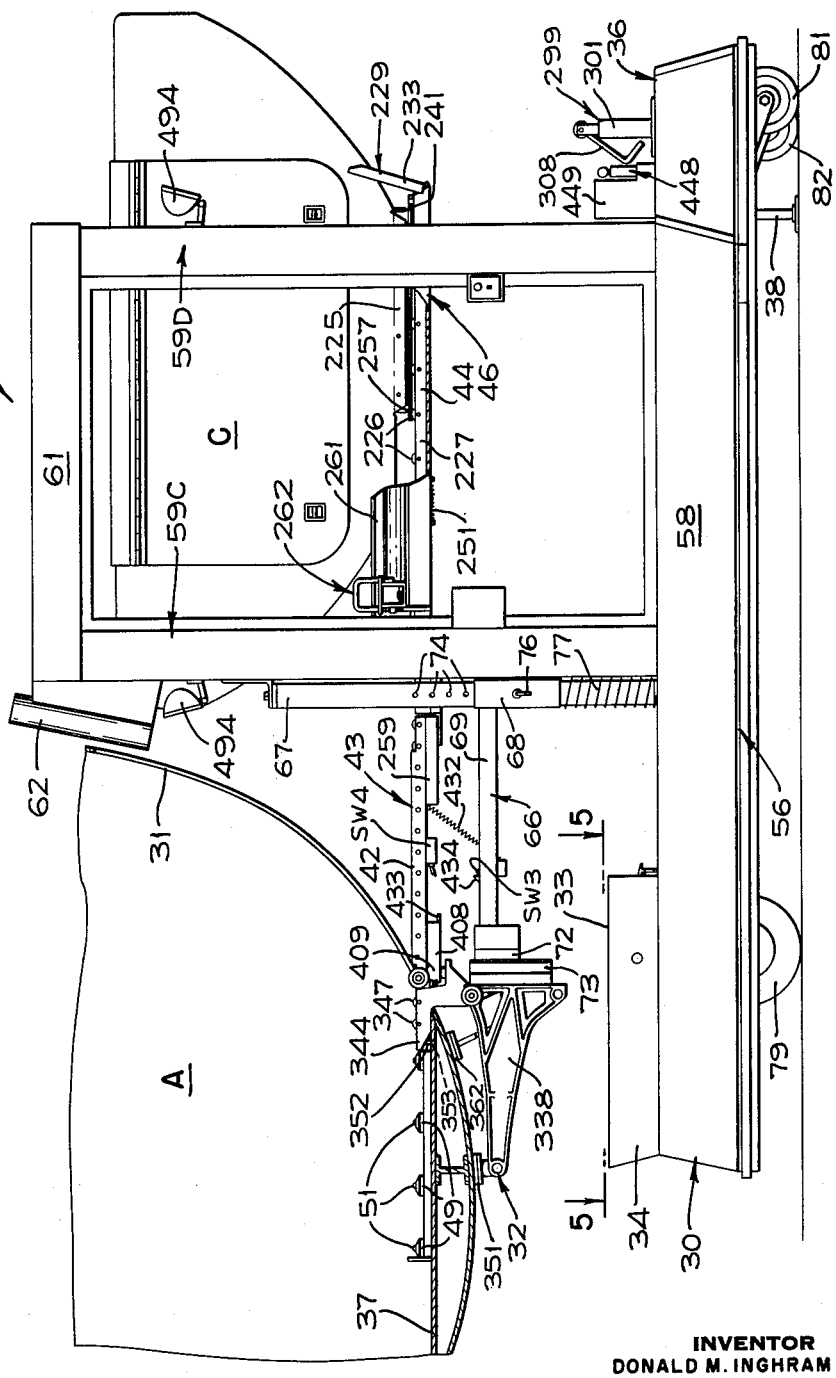

June 9, 1964  D. M. INGHRAM  3,136,433
CARGO HANDLING APPARATUS
Filed May 12, 1961  16 Sheets-Sheet 3
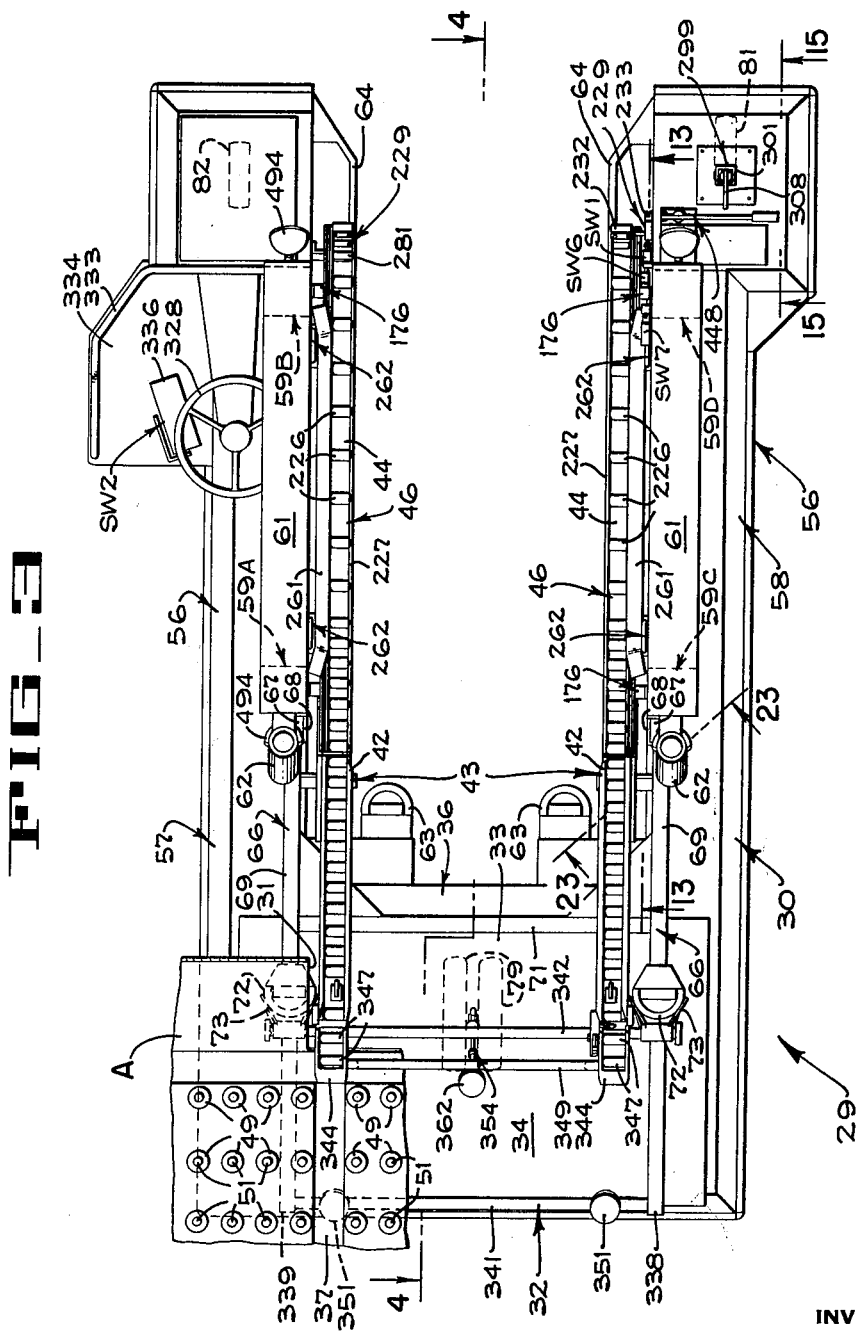
INVENTOR
DONALD M. INGHRAM
BY Hans G. Hoffmeister
ATTORNEY

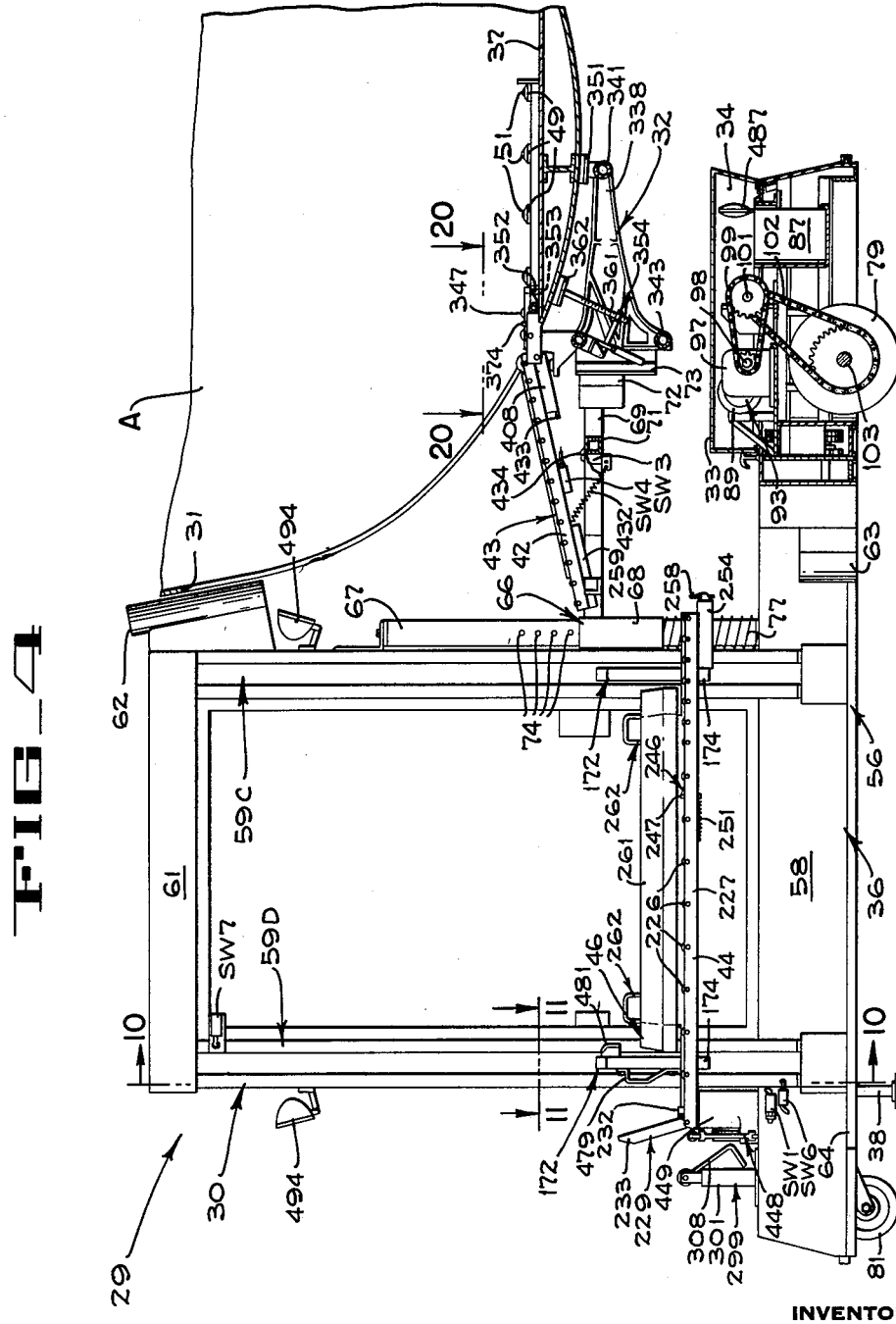

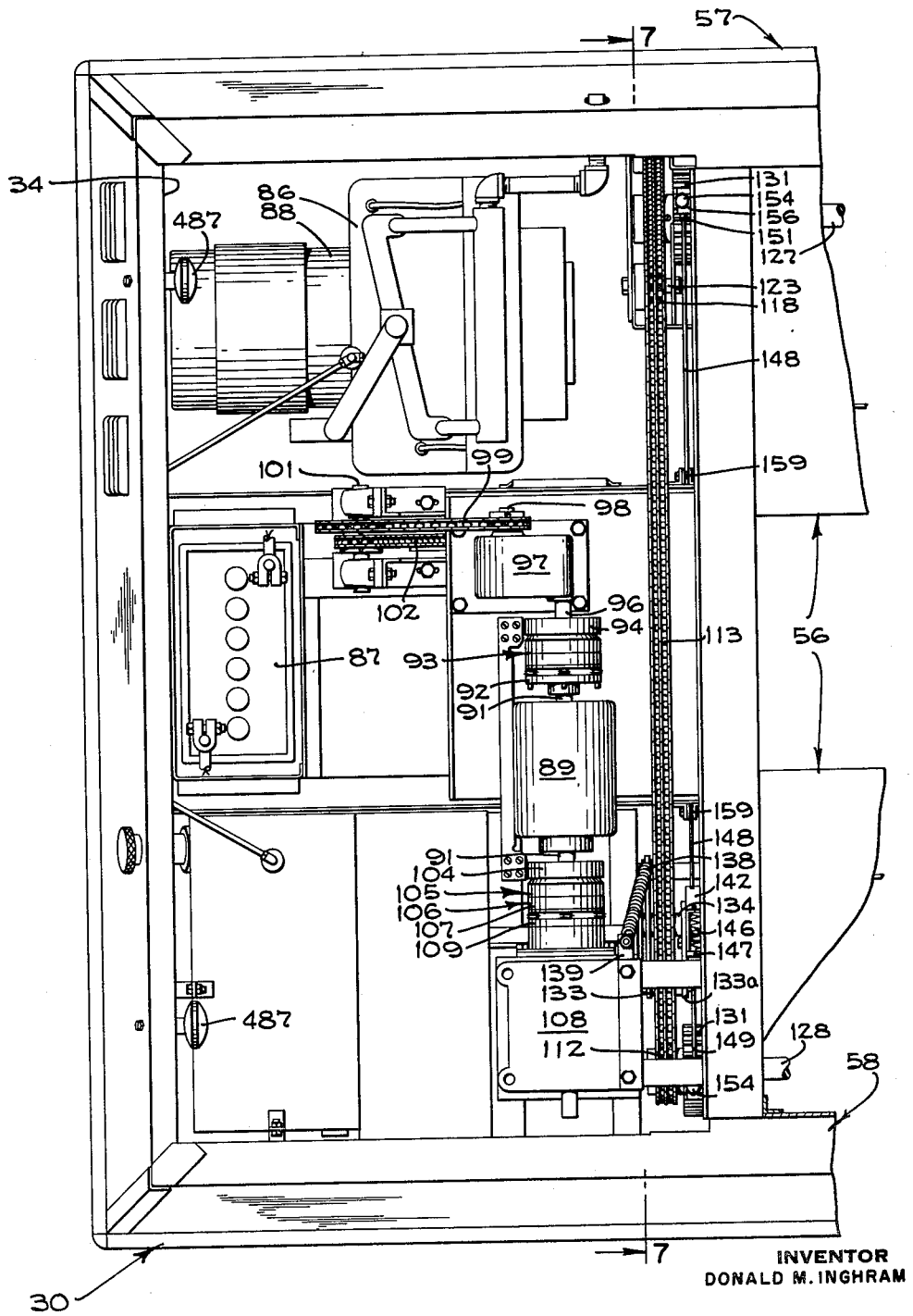
FIG_5

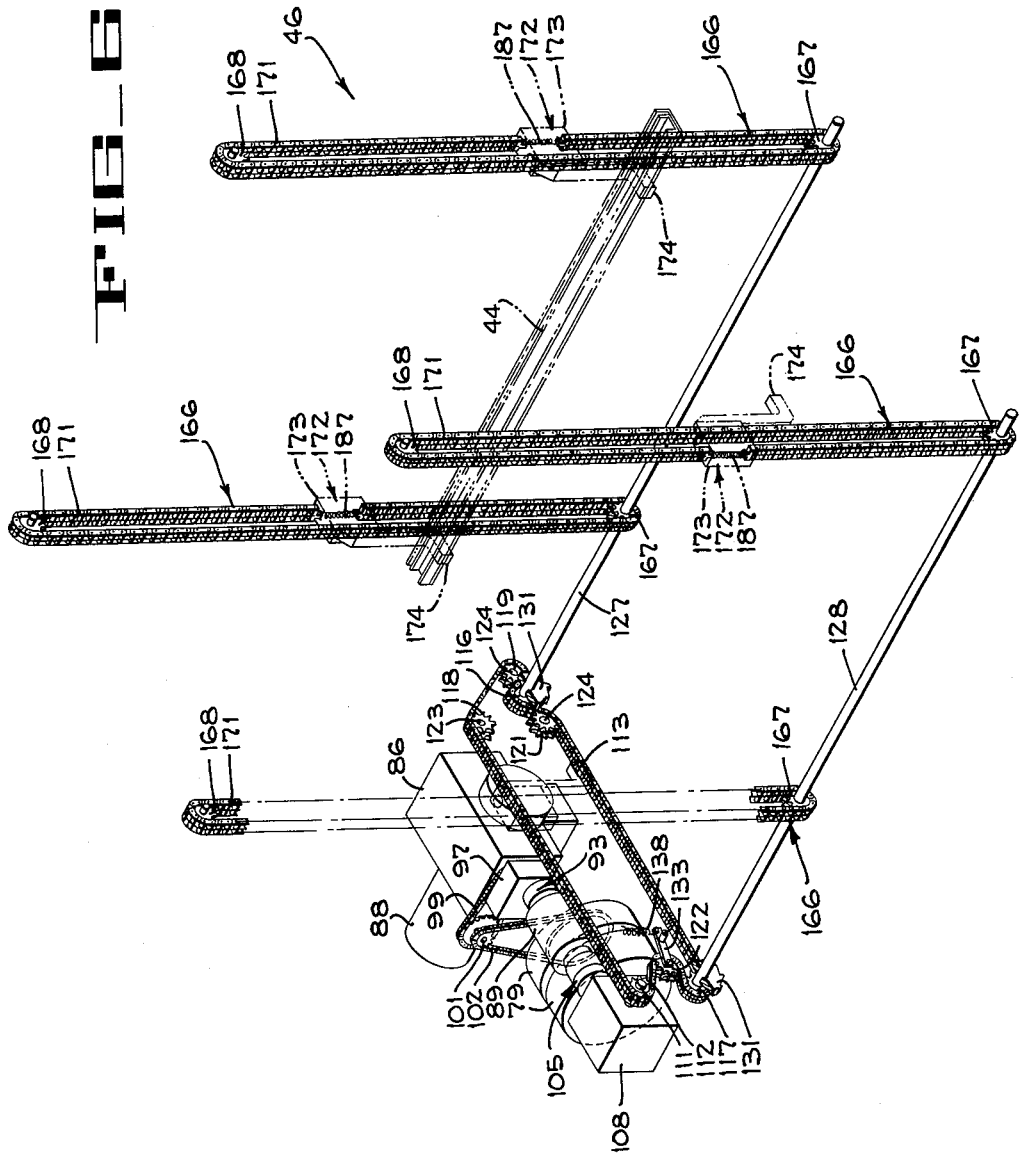

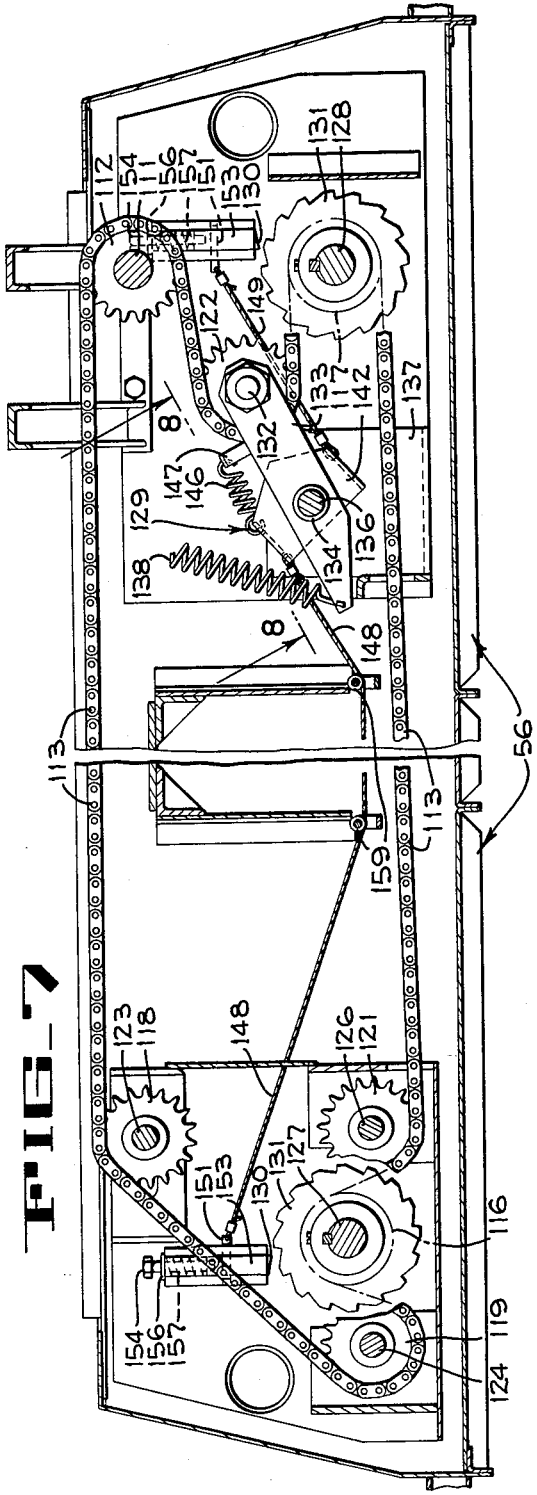

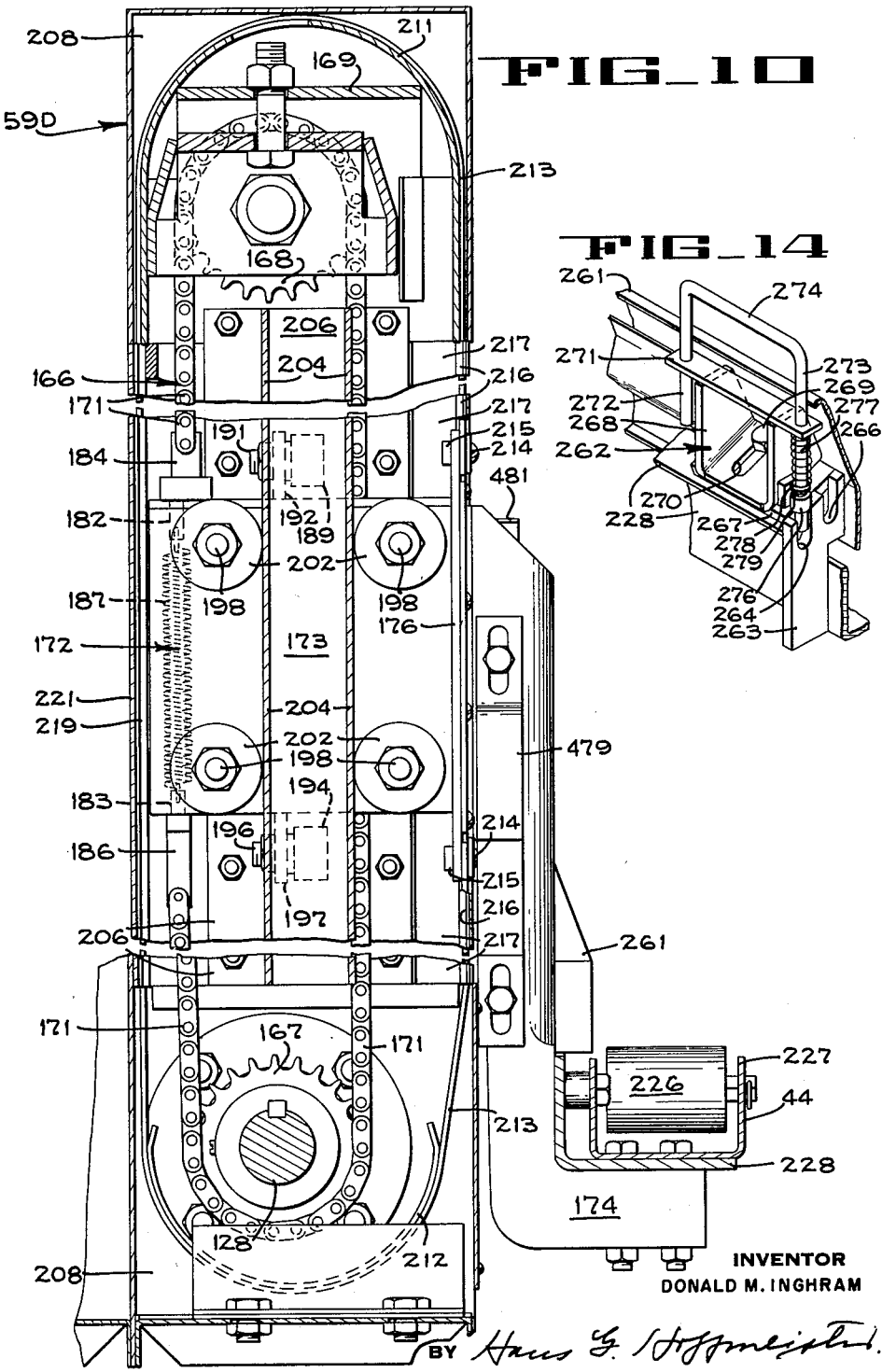

June 9, 1964 D. M. INGHRAM 3,136,433
CARGO HANDLING APPARATUS
Filed May 12, 1961 16 Sheets-Sheet 9
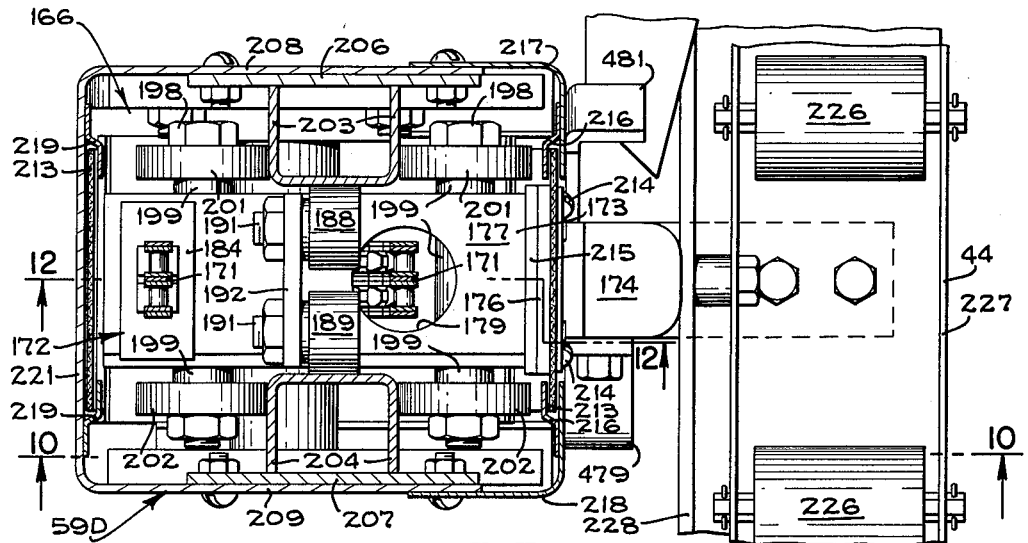
FIG_11
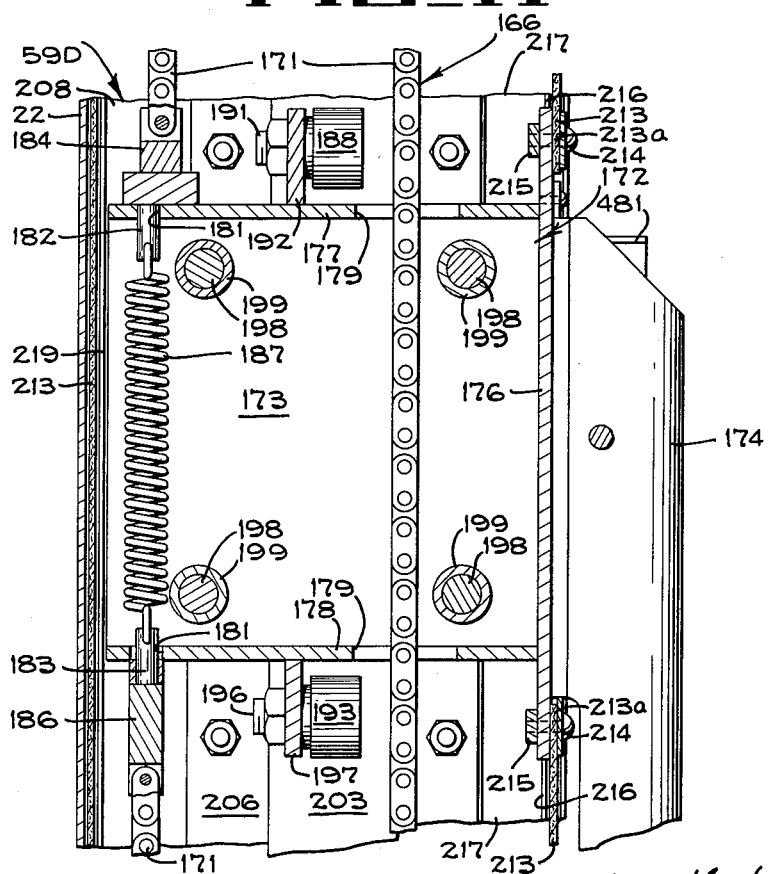
FIG_12
INVENTOR
DONALD M. INGHRAM
BY Hans G. Hoffmeister
ATTORNEY

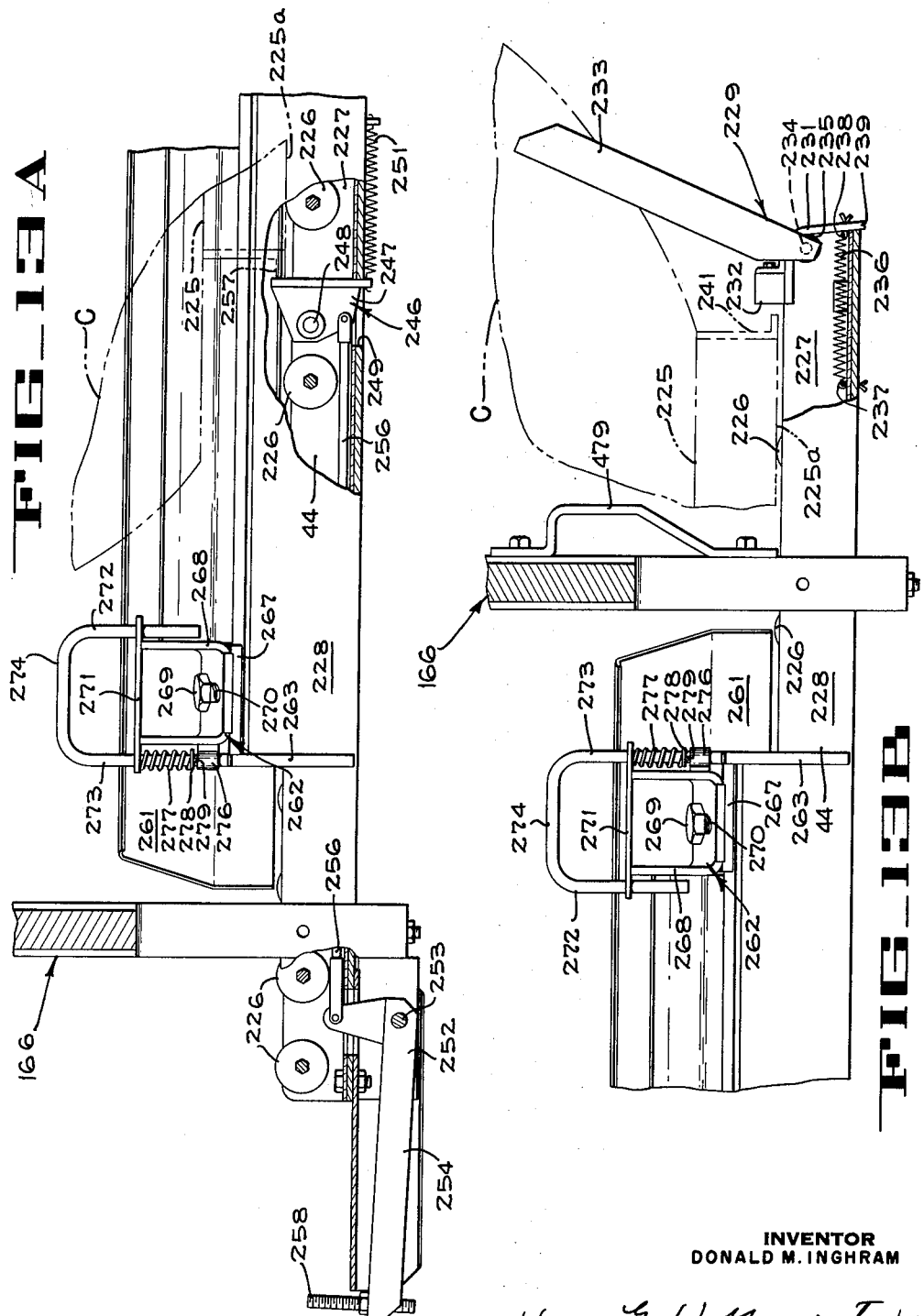

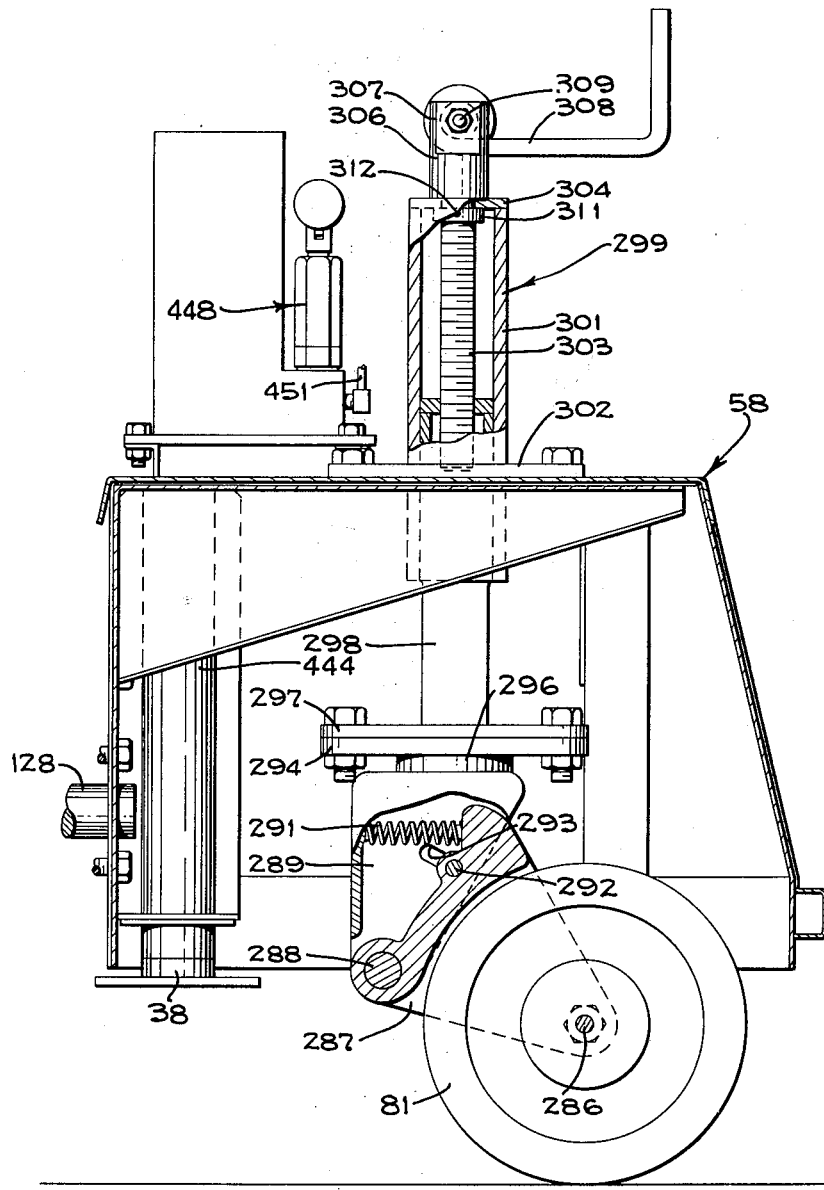

June 9, 1964 D. M. INGHRAM 3,136,433
CARGO HANDLING APPARATUS
Filed May 12, 1961 16 Sheets-Sheet 12
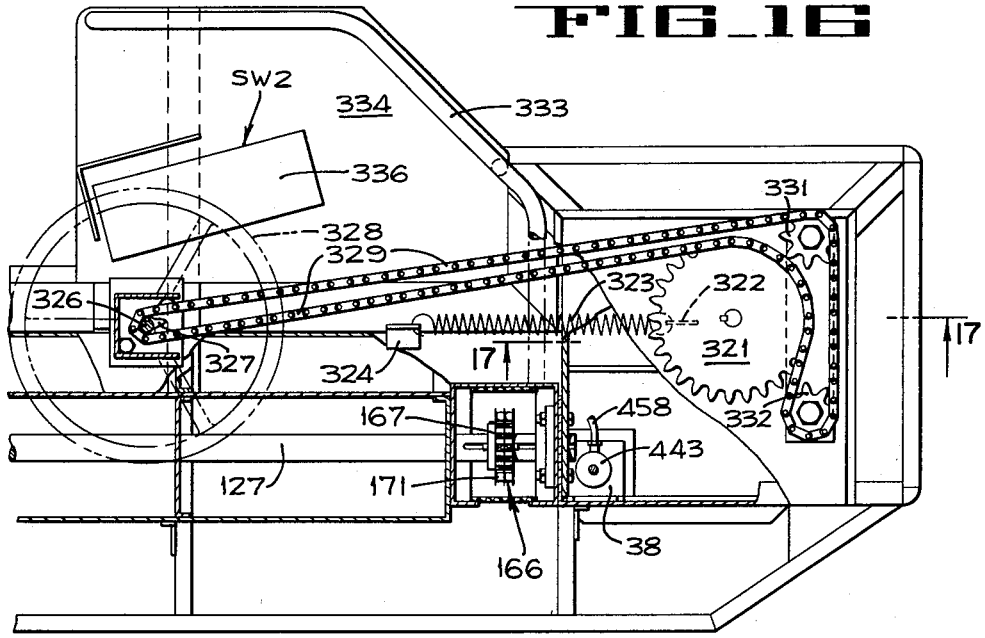
FIG_16
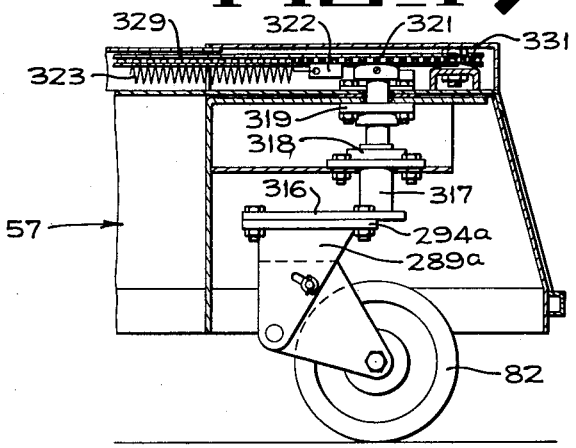
FIG_17
INVENTOR
DONALD M. INGHRAM
BY *Hans G. Hoffmeister*
ATTORNEY

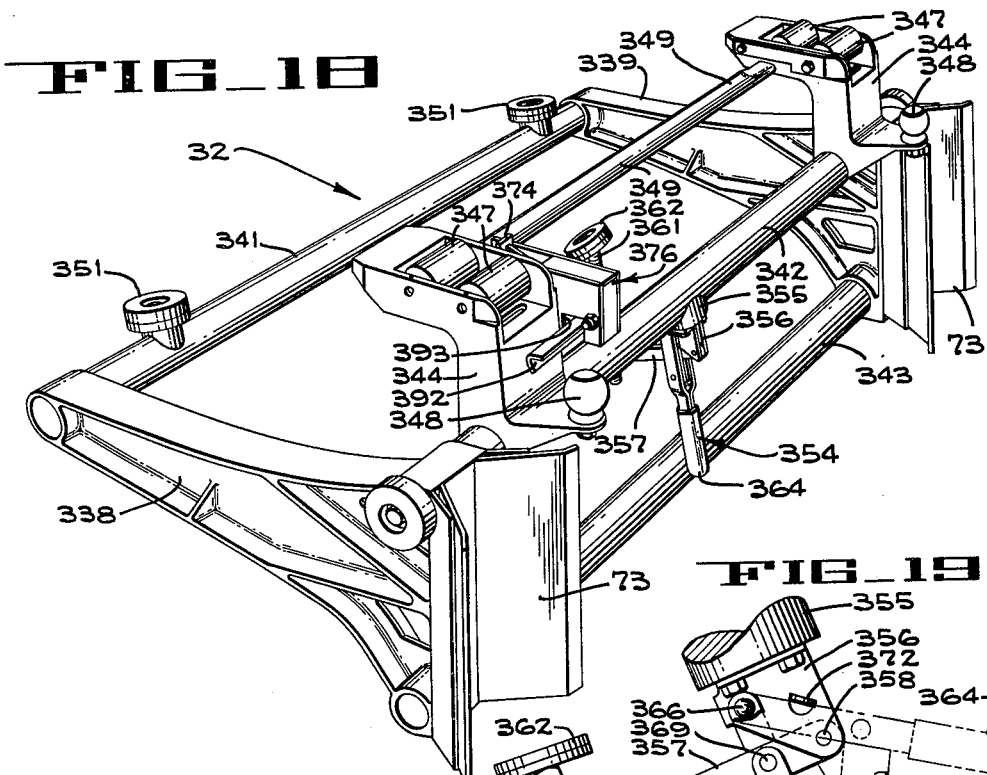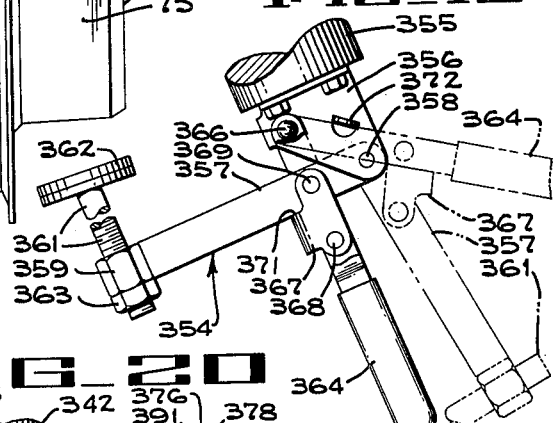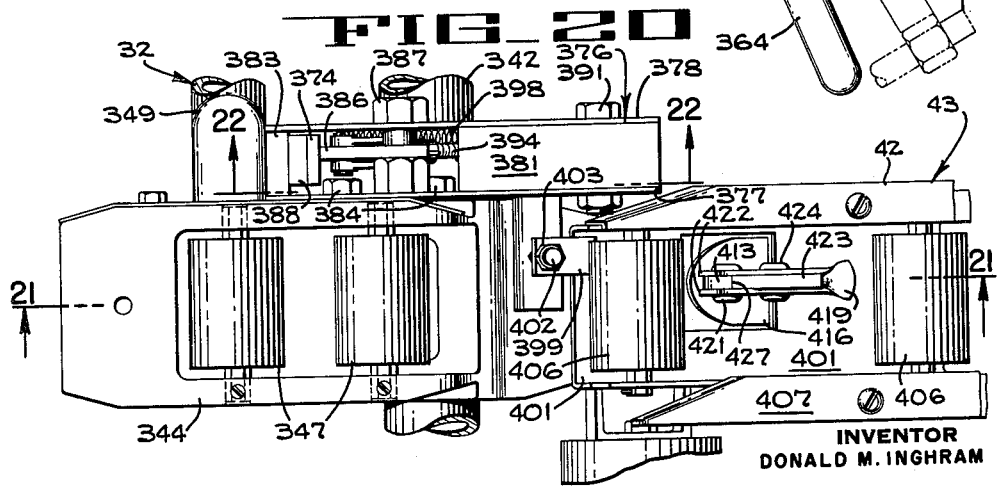

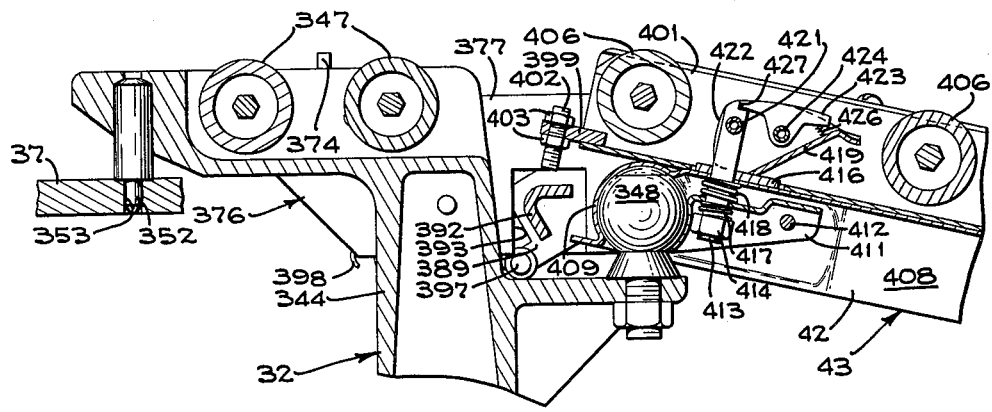
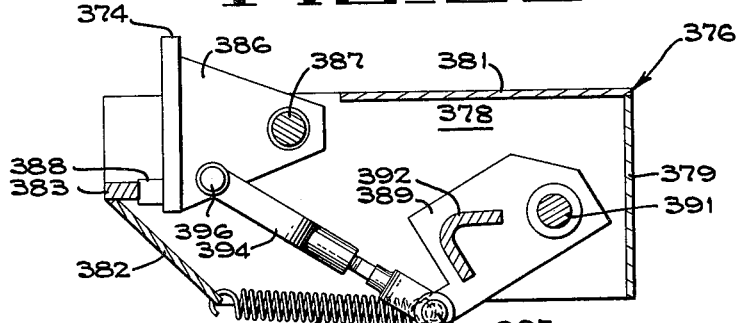
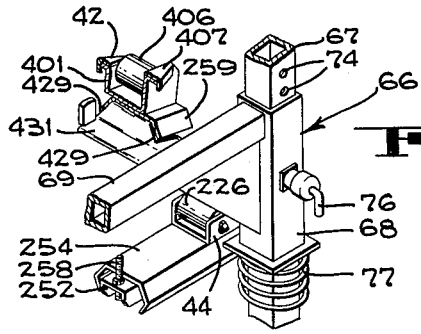

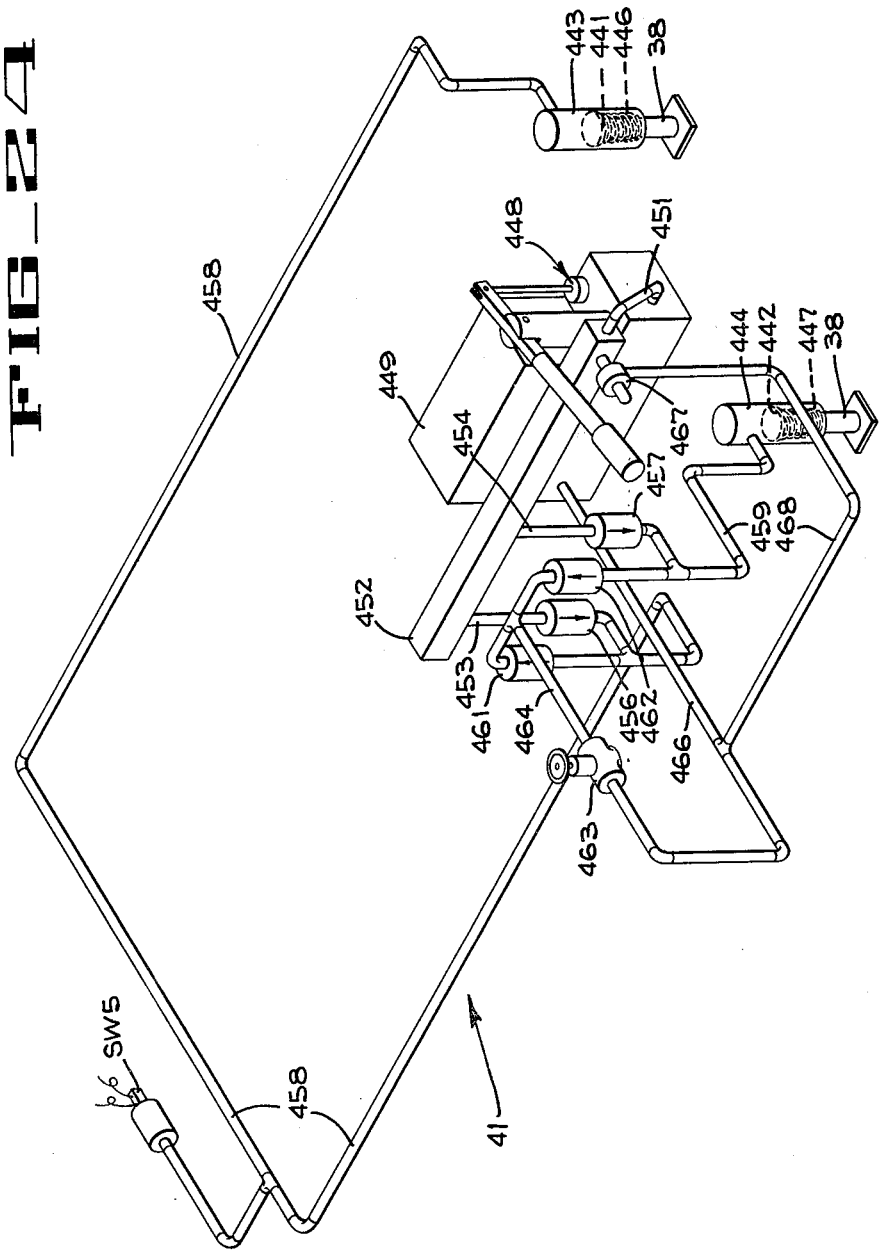

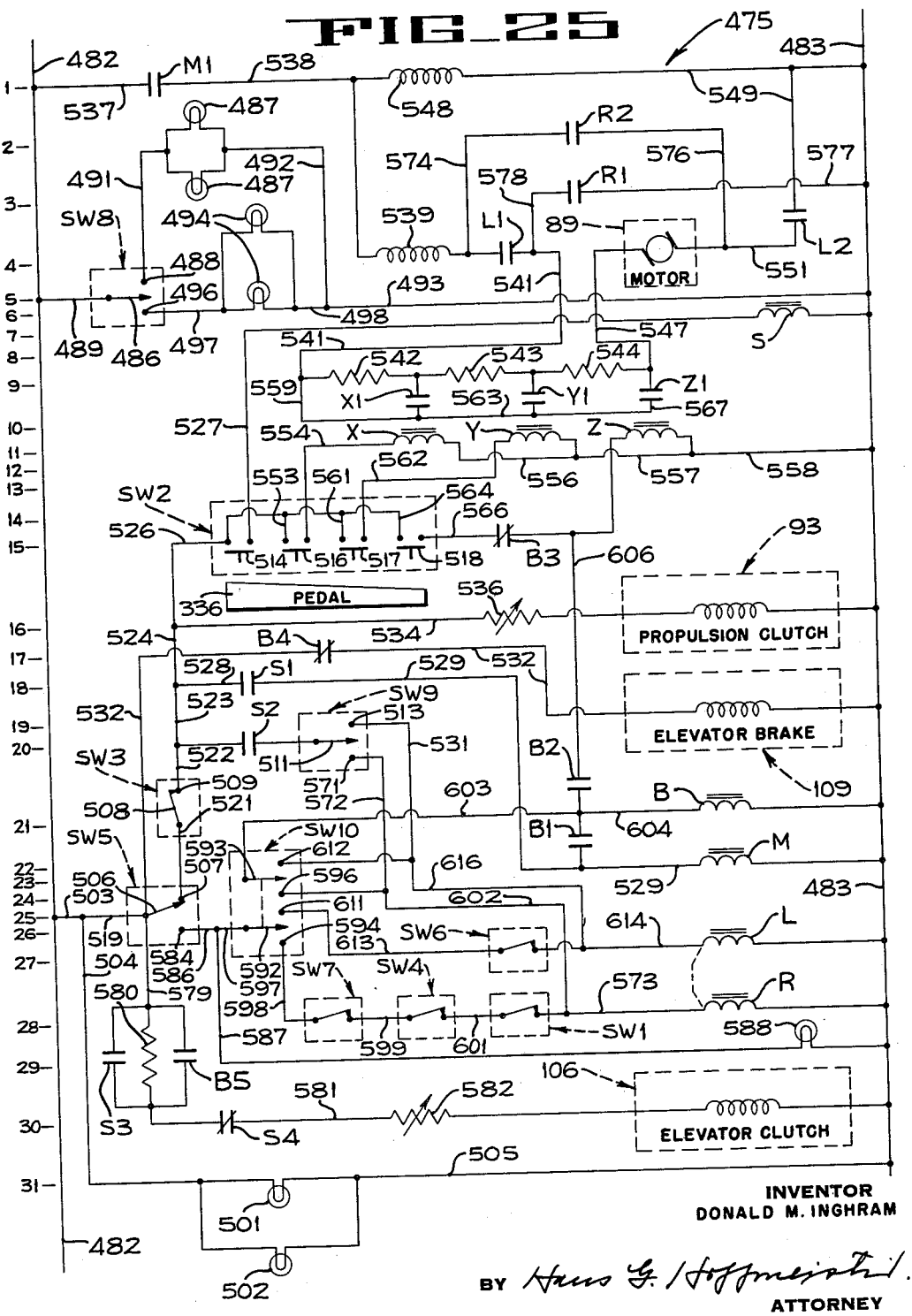

United States Patent Office 3,136,433
Patented June 9, 1964

3,136,433
CARGO HANDLING APPARATUS
Donald M. Inghram, Santa Clara, Calif., assignor to FMC Corporation, a corporation of Delaware
Filed May 12, 1961, Ser. No. 109,731
23 Claims. (Cl. 214—38)

The present invention pertains to cargo handling apparatus and more particularly relates to a self-propelled mobile apparatus for loading and unloading an aircraft.

As the size and cargo-carrying capacity of large military and commercial type aircraft have increased, it has become apparent that more efficient loading means must be employed to reduce the time required for loading and unloading the aircraft so as to make more efficient use of the aircraft. One well known procedure of reducing loading time has been to preload the cargo, except for very large pieces, into baggage containers and thereafter move the containers to the loading station by means of trailers prior to the arrival of the aircraft at the loading station. The present invention concerns an improved apparatus that is employed to rapidly load these containers onto or remove them from the aircraft so that the aircraft's non-flying time will be reduced to a minimum.

Although the mobile apparatus of the present invention will be referred to as a baggage loader so as to distinguish the cargo placed in the baggage containers from cargo which is too large for the containers, it will be understood that larger pieces of cargo may be placed on pallets or the like and then be handled by the present apparatus.

Heretofore, many different types of apparatus have been employed to load and unload baggage from aircraft. The apparatus used for this purpose have usually been expensive, cumbersome and slow in operation, and have had no provision for adapting themselves to the various attitudes that the aircraft might assume during loading. Also, many of the prior art units have been difficult to align with the cargo door since they were in the form of specially equipped trucks that had to be backed into alignment with the cargo door or doors of the aircraft.

Accordingly, one object of the present invention is to provide an improved baggage handling apparatus capable of loading or unloading many different types of aircraft.

Another object is to provide a self-propelled mobile baggage handling apparatus which is readily aligned with and connected to an aircraft.

Another object is to provide a baggage handling apparatus having means for guiding the apparatus into loading position in alignment with the cargo door of an aircraft.

Another object is to provide a self-propelled mobile apparatus which is connected to an aircraft and remains connected thereto while one or more baggage containers are loaded into and/or unloaded from the aircraft.

Another object is to provide a self-propelled baggage handling apparatus which may be readily adjusted so that the cargo supporting surface of the apparatus can assume an inclined attitude substantially matching the attitude of a grounded aircraft whose floor is inclined, and is capable of maintaining its position during the loading or unloading operations.

Another object is to provide a baggage handling apparatus arranged to automatically terminate the upward movement of baggage at the elevation of the aircraft's floor.

Another object is to provide a baggage handling apparatus having means which will permit the removal of a baggage container from an aircraft only after the container support surface of an associated elevating mechanism of the apparatus is level with a support surface of the aircraft floor.

Another object is top rovide a self-propelled mobile baggage handling apparatus having control means for positively immobilizing the propulsion circuit of the apparatus when the apparatus is connected to the aircraft.

Another object is to provide a self-propelled mobile baggage handling apparatus having control means for immobilizing a container elevating mechanism if the container is improperly positioned thereon.

Another object is to provide a baggage handling apparatus having a container elevating mechanism and means for locking the container on the mechanism until the container support surface of an associated elevating mechanism becomes level with a container support surface of the floor of the aircraft.

Another object is to provide a container handling apparatus which is adjustable to match the inclination of the container support surface of the apparatus to the inclination of the support surface of the aircraft, and which includes means for locking the apparatus in this inclined attitude and preventing actuation of an associated container elevating mechanism until such locking is accomplished.

Another object is to provide a baggage handling apparatus having means for locking the elevating mechanism in fixed position in the event of drive chain breakage.

Another object is to provide a baggage handling apparatus having an adaptor which is readily secured to the aircraft.

Another object is to provide a baggage handling apparatus having a free floating bridge assembly connected to the aircraft to insure that excessive loads are not imposed upon the aircraft or upon the loader due to aircraft attitude changes caused by gusts of wind, load changes, or the like.

These and other objects and advantages of the present invention will become apparent from the following description and the accompanying drawings, in which:

FIG. 1 is a perspective of the baggage handling apparatus, hereinafter termed the baggage loader, showing the loader connected to an aircraft with a baggage container on the elevating mechanism and with an empty trailer partially disposed under the baggage container.

FIG. 2 is an enlarged elevation of the left side of the loader showing the baggage loader connected to the aircraft with the elevating mechanism in a position for permitting the transfer of a container from the loader to the aircraft, certain parts being broken away and others shown in section.

FIG. 3 is a plan of the loader shown connected to a fragment of the aircraft.

FIG. 4 is a vertical section taken along lines 4—4 of FIG. 3 showing the elevating mechanism of the loader in an intermediate position.

FIG. 5 is an enlarged plan, taken looking downwardly in the direction of the arrows 5—5 in FIG. 2, and showing the engine compartment of the loader from which the upper engine compartment cover has been removed.

FIG. 6 is a diagrammatic perspective of the drive parts of the baggage loader.

FIG. 7 is an enlarged transverse vertical section taken along lines 7—7 of FIG. 5 and showing certain drive parts of the loader.

FIG. 8 is an enlarged section taken along lines 8—8 of FIG. 7.

FIG. 9 is an enlarged section taken along lines 9—9 of FIG. 8.

FIG. 10 is an enlarged fragmentary vertical section taken along lines 10—10 of FIGS. 4 and 11.

FIG. 11 is an enlarged horizontal section taken along lines 11—11 of FIG. 4.

FIG. 12 is an enlarged vertical section taken along lines 12—12 of FIG. 11.

FIGS. 13A and 13B, when placed end to end, make up a fragmentary vertical section taken along lines 13—13 of FIG. 3, showing certain of the baggage container locking mechanisms, certain parts being broken away and other parts being shown in section.

FIG. 14 is an enlarged perspective of a fence adjustment mechanism used to adjust the position of the fence shown in FIG. 13B.

FIG. 15 is an enlarged vertical section taken along lines 15—15 of FIG. 3 and showing one of the casters and the associated hydraulic locking and leveling unit.

FIG. 16 is an enlarged horizontal section taken substantially along lines 16—16 of FIG. 1, showing the steering mechanism, certain parts being broken away and others shown in phantom.

FIG. 17 is a vertical section taken along lines 17—17 of FIG. 16.

FIG. 18 is a perspective of an adaptor which is arranged to be clamped to the aircraft.

FIG. 19 is an elevation of an adaptor locking device with parts shown in two operative positions, certain parts being broken away.

FIG. 20 is an enlarged plan of a portion of the adaptor and the bridge assembly looking in the direction of the arrows 20—20 of FIG. 4 and showing a container lock associated with the bridge assembly which is in a downwardly inclined position.

FIG. 21 is a section taken along lines 21—21 of FIG. 20.

FIG. 22 is an enlarged section taken along lines 22—22 of FIG. 20.

FIG. 23 is a perspective looking in the direction of arrows 23—23 in FIG. 3 and showing an elevator conveyor spaced from a bridge conveyor.

FIG. 24 is a diagrammatic perspective of the hydraulic locking system used in the baggage loader of the present invention.

FIG. 25 is a wiring diagram of the electrical control circuit used in the baggage loader.

Briefly, the major structural components and the operation of the mobile, self-propelled baggage loader of the present invention are as follows. The baggage loader 29 (FIGS. 1, 2 and 4) includes a mobile carrier 30 and an adaptor 32, which is designed for the particular aircraft to be loaded, and is carried on the housing 33 of an engine compartment 34 at the forward end of the U-shaped body 36 (FIG. 3) of the baggage loader when the loader is moved toward or away from the loading station. At the beginning of a loading operation, the loader is driven to a position adjacent the cargo opening 31 of the plane and the adaptor 32 is removed from the carrier and manually placed on and locked to the floor 37 (FIG. 2) of the aircraft at the cargo opening 31.

To accurately align the carrier 30 with the adaptor and the aircraft, the carrier is driven into abutting engagement with the adaptor 32 and is hydraulically locked in this position by two locking feet 38 (only one being shown in FIGS. 2 and 4) of a hydraulic locking system 41. The forward ends of two spaced roller conveyors 42 of a bridge assembly 43 of the carrier are then pivotally connected to the adaptor 32. Then, a trailer T with a baggage container C thereon is manually pushed within the U-shaped body 36 of the baggage carrier 30 to position the container above two spaced roller conveyors 44 (FIG. 3) of a baggage container elevating mechanism 46, said conveyors being at this time in their lowermost position below the level of the supporting surface 47 of the trailer.

The elevating mechanism 46 is power driven and is actuated to lift the container C, the rear ends of bridge conveyors 42, and the elevator conveyors 44 to a position at which the support surfaces of the conveyors are at the level of a support surface provided on the floor 37 of the aircraft A. When this level has been reached, the elevating mechanism 46 automatically stops. The container C is then manually pushed into the aircraft. The support surface of the floor 37 of the aircraft is formed by any suitable conveying system such, for example, as a plurality of sockets 49 having balls 51 journalled therein and positioned in transverse rows in alignment with the conveyors 42 and 44 so that the containers can easily be pushed into the aircraft. The balls 51 are also arranged in a plurality of longitudinally extending rows, as indicated in FIG. 3, so that the container can be pushed longitudinally of the aircraft.

It will be understood that the aircraft A and its conveying system, the constructional details of the baggage container C, and the constructional details of the trailer T form no part of the present invention and have been described only as an aid in understanding the operation of the baggage loader 29 of the present invention. It is also to be understood that the adaptor 32 is a part of the baggage loader 29 and that minor alterations may be made to the adaptor 32 so that the loader may be used with different makes and models of aircraft.

More specifically, the U-shaped body 36 (FIG. 3) of the baggage carrier 30 of the present invention comprises a substantially tubular frame structure 56 which is U-shaped in plan and includes the engine compartment 34 at the forward end of the carrier from which two spaced horizontal legs 57 and 58 extend rearwardly. Four vertically extending tubular columns (FIGS. 1 and 2) are provided, two columns 59A and 59B being secured to the leg 57 and two columns 59C and 59D being secured to the leg 58. The upper ends of the two columns on each leg 57 and 58 are interconnected by beams 61.

Resilient tubular bumpers 62 (FIG. 1) are secured to the upper ends of each forward column 59 so as to protect the skin of the aircraft A from contact with solid portions of the loader 30. Similar resilient tubular bumpers 63 (FIG. 3) are disposed within the U-shaped area defined by the frame structure 56 and provide an abutment for the trailer T (FIG. 1) when the trailer T is moved into loading or unloading position in the carrier. Guide rails 64 (FIGS. 3 and 4) are secured to the lower end of the inner surfaces of the associated legs 57 or 58 and extend from the rear end of the legs to the bumper 63 so as to guide the trailer T into the carrier.

In order to accurately position and align the carrier 30 with the cargo opening 31 of the aircraft A, an alignment assembly 66 (FIGS. 2, 3 and 4) is mounted on the forward portion of the carrier 30. The alignment assembly 66 is mounted on two vertical posts 67 of square cross-section, one post 67 being secured to the leg 57 and the associated forward column 59A while the other post 67 is secured to the leg 58 and its associated forward column 59C. The alignment assembly 66 includes a pair of tubular sleeves 68 of square cross-section each of which is slidably mounted on the associated post 67. Each sleeve has an arm 69 secured thereto and extending forwardly therefrom. The arms 69 are interconnected near their forward ends by a transverse beam 71, and each arm 69 has a resilient tubular bumper 72 at its forward end. As will be explained in more detail later, when the carrier 30 is moved into the loading position, the bumpers 72 engage and cooperate with substantially V-shaped guides 73 on the adaptor 32 to aid in properly aligning and positioning the carrier 30 relative to the cargo opening 31. The V-shaped guides are vertically elongated to permit vertical movement of the aircraft, due to load changes therein, without danger of the bumpers and guides becoming disengaged.

Since the cargo openings of the many types of aircraft which may be serviced by the baggage loader 30 are not all at the same elevation, the alignment assembly 66 is vertically adjustable on the posts 67. Each of a plurality of vertically spaced holes 74 (FIG. 2) in each post 67 is adapted to receive a pin 76 which extends through an opening in the sleeve 68 to lock the alignment assembly 66 at the proper elevation. A spring 77 is positioned around each post 67 and is disposed between the associated sleeve 68 and either leg 57 or leg 58, and serves to counterbalance the assembly 66. The holes 74 are preferably labeled with the names of the aircrafts and the position (forward or aft) of the cargo doors to aid the operator in setting the assembly 66 at the proper elevation.

The mobile carrier 30 is supported at its forward end on a pair of closely spaced drive wheels 79 (FIGS. 3 and 6) disposed near the transverse center of the engine compartment 34. A free swiveling caster wheel 81 (FIG. 3) at the free end of the left leg 58 and a steerable caster wheel 82 at the free end of the right leg 57 cooperate with the drive wheels 79 to provide a three point rolling suspension for the carrier 30.

The carrier 30 is powered by an engine 86 (FIGS. 5 and 6) which is provided with the usual battery 87 and is directly connected to a generator 88 which supplies 28 volt D.C. current to a multi-speed, reversible electric motor 89 and associated electrical components. The drive shaft 91 (FIG. 5) of the motor 89 projects outwardly from both ends of the motor. The drive element 92 of a propulsion magnetic clutch 93 is connected to one end of the shaft 91 while the driven element 94 of the clutch 93 is connected to the input shaft 96 of a gear reducer 97. The output shaft 98 of the gear reducer 97 is connected by a chain drive 99 to an idler shaft 101 which is journalled in the engine compartment 34. A second chain drive 1022 connects the idler shaft 101 to the shaft 103 (FIG. 4) upon which the drive wheels 79 are secured. The shaft 103 is mounted for rotation in the engine compartment on bearings (not shown). Certain controls, to be described later, are provided for causing the motor 89 to drive the carrier 30 at four different speeds in both the forward and reverse directions.

An electro-magnetic clutch-brake 105 (FIG. 5) includes the drive element 104 of an elevator magnetic clutch 106, which element 104 is mounted on the other end of the motor shaft 91, while the driven element 107 of the clutch 106 is connected to the input shaft (not shown) of a gear reducer 108. A magnetic elevator brake 109 is associated with the clutch 106 and when energized, locks the input shaft of the gear reducer 108 in fixed position.

The propulsion magnetic clutch 93 and the electro-magnetic clutch-brake 105 are both of conventional design and therefore the internal parts of these units will not be described in detail.

The output shaft 111 (FIGS. 6 and 7) of the gear reducer 108 has an elevator drive sprocket 112 keyed thereon. A drive chain 113 is trained around the drive sprocket 112, around a right elevator sprocket 116, a left elevator sprocket 117, idler sprockets 118, 119 and 121, and around a sprocket 122 which, as will be explained presently, is part of the elevator locking mechanism that automatically arrests movement of the elevator if the chain 113 breaks. The idler sprockets 118, 119 and 121 are keyed to stub shafts 123, 124 and 126, respectively, which are mounted for rotation in the engine compartment 34. The right elevator sprocket 116 is secured to one end of an elongated right elevator drive shaft 127 which is journalled in the right leg 57 (FIG. 3) of the tubular frame structure 56. The elevator sprocket 117 is secured to one end of an elongated left elevator drive shaft 128 which is journalled in the left leg 58 of the tubular frame structure 56. It will be noted that the chain 113 (FIG. 7) is trained around the elevator sprockets 116 and 117 so as to drive the shafts 127 and 128 in opposite directions relative to each other.

In order to prevent the possibility of injury to personnel if the drive chain 113 should break when the baggage elevating mechanism 46 is supporting a baggage container, an elevator shaft locking mechanism 129 (FIG. 7) is provided. The locking mechanism 129 is effective, upon breakage of the chain 113, to simultaneously release two locking bars 130 which are urged downwardly into locking engagement with the teeth of associated ratchets 131. One of the ratchets 131 is keyed to the shaft 127 while the other is keyed to the shaft 128. Thus, the engagement of the bars 130 with ratchets 131 will positively lock the shafts 127 and 128 in fixed position.

The locking mechanism 129 includes the sprocket 122 which is journalled on a bolt 132 and is disposed between a pair of parallel, spaced arms 133 and 133a (FIG. 8). The bolt 132 is secured near one end of the arms 133 and 133a, which arms are welded to a sleeve 134. The sleeve 134 is pivotally mounted on a pivot pin 136 (FIG. 9) which is secured to and projects outwardly from a vertical bracket 137 of the frame structure 56. A spring 138 (FIG. 7) which is connected to the arm 133 and to a bracket 139 (FIG. 5) bolted to the gear reducer 108, normally urges the arms 133 and 133a to pivot in a clockwise direction (FIG. 7).

A cable attachment bracket 142 is pivotally mounted on the pivot pin 136 so that a shoulder bolt 143 (FIGS. 8 and 9), which is screwed into the arm 133a and projects through a slot 144 in the bracket 142, is effective to limit pivotal movement of the arm 133a relative to the bracket 142. A spring 146 is connected between the attachment bracket 142 and a bracket 147 welded to the arm 133a and normally urges the attachment bracket 142 to pivot in a clockwise direction (FIG. 9). Cables 148 and 149 are attached to the bracket 142 and to pins 151 (FIG. 7). Each pin 151 extends through holes in one of the aforementioned square locking bars 130 and in an associated tubular housing 153 of rectangular cross-section within which the associated bar 130 is slidably mounted. A cap screw 154 is associated with each housing 153 and extends through an apertured cap 156 which is welded to the tubular housing 153 and is screwed into the associated locking bar 130. A spring 157 in each tubular housing 153 urges the associated locking bar 130 downwardly towards the adjacent ratchet 131 which is disposed immediately below the associated locking bar 130 as shown in FIG. 7. It is to be noted that the cable 148 is engaged and guided by two pulleys 159 journalled on the frame and that the spring 146 maintains this engagement.

Accordingly, if the chain 113 shouldl break, the spring 138 would immediately pivot the arm 133 in a clockwise direction (FIG. 7) causing the shoulder bolt 143 to contact the lower end of the slot 144 thereby exerting a force through the cables 148 and 149 which pulls the pin 151 out of the holes in the associated locking bars 130 and in the housings. The springs 157 urge the associated locking bars into locking engagement with the teeth of the ratchets 131 thereby locking the shafts 127 and 128 in fixed position.

Partially positioned within each of the four vertical columns 59A–59D (FIG. 1) is an elevator 166 (FIG. 6), two of the elevators having drive sprockets 167 keyed on the right side elevator shaft 127 and the other two elevators 166 having their drive sprockets 167 keyed to the left side elevator shaft 128. Since the elevators 166 are identical except for certain switch actuating means on the rear left column 59D, the description of this column 59D will be sufficient to disclose the construction and operation of all four columns.

Referring to FIGS. 6, 10, 11 and 12, each elevator 166 comprises one of the sprockets 167, an idler sprocket 168 journalled on a vertically adjustable bearing support 169 (FIG. 10) at the upper end of the column, a chain 171 trained around the sprockets 167 and 168, and a carrier 172 disposed between the sprockets and connected to the ends of the chain 171. The carrier 172 comprises a fabricated, generally rectangular hollow block 173 having, at one side, a downwardly extending L-shaped conveyor support 174 (FIG. 10) formed integrally with the inner vertical wall 176 of the block 173. The upper and lower walls 177 and 178, respectively, are provided with aligned openings 179 (FIG. 12) for one run of the chain 171 to pass through, and with smaller aligned openings 181 to receive the stems 182 and 183 of an upper and a lower chain connector 184 and 186, respectively. The connector 184 is welded to the upper wall 177 and the connector 186 is slidably received in lower wall 178. The chain connectors 184 and 186 are connected together by a spring 187 which serves to automatically compensate for chain wear to maintain the chain in firm driving engagement with sprockets 167, 168. A pair of rollers 188 and 189 (FIG. 11) are journalled on shoulder bolts 191 which are bolted to a vertically extending tab 192 welded to the upper wall 177. Similarly, a pair of rollers 193 (FIG. 12) and 194 (FIG. 10) are journalled on shoulder bolts 196 which are bolted to a tab 197 projecting downwardly from the lower wall 178. Four bolts 198 extend transversely through sleeves 199 secured to the block 173, and each bolt has a pair of rollers 201 and 202 journalled thereon.

U-shaped, vertically extending tracks 203 and 204 (FIG. 11) are welded to plates 206 and 207, respectively. The plates 206 and 207 are bolted to the side walls 208 and 209 of the column 59D and extend substantially the entire length of the column. It will be apparent that the track 203 provides a guide surface for the rollers 188, 193 and 201, and the track 204 provides a surface for the rollers 189, 194 and 202 to guide the carrier 172 for vertical movement.

An upper arched belt guide 211 (FIG. 10) and a lower belt guide 212 are secured within the column 59D and guide a flat belt 213 around the ends of the elevator 166. The ends 213A (FIG. 11) of the belt 213 are secured by bolts 214 and straps 215 (FIG. 12) to the inner wall 176 of the block 173. The longitudinal edges of the inner run of the belt 213 are guided by tracks 216 (FIG. 11) formed on corner mouldings 217 and 218 bolted to the walls 208 and 209. The longitudinal edges of the outer run of the belt 213 are guided by similar tracks 219 secured to the outer wall 221 of the column 59D. The belt 213 serves as a guard and as a dust cover.

As mentioned above, each block 173 in each column has a depending L-shaped leg 174. As seen in FIGS. 4 and 6 one of the roller conveyors 44 of the baggage containing elevating mechanism 46 is mounted on the two L-shaped conveyor supports 174 on the left side of the carrier 30 while the other roller conveyor 44 is mounted on the two supports 174 on the right side of the loader. Accordingly, when the drive shafts 127 and 128 are rotated, the two roller conveyors 44 will be raised or lowered.

The conveyor 44 on the left side of the baggage loader is best shown in FIGS. 10 and 13A and comprises a plurality of rollers 226 journalled for free rotation in a channel frame 227 and adapted to receive, in supporting relation, one side member 225a (FIG. 13B) of a reinforcing box-like structure 225 secured to the underside of the container C. The channel frame 227 is strengthened by a structural member 228 (FIG. 10) having a Z-shaped central section. The member 228 and channel 227 are bolted to both L-shaped conveyor supports 174 on the left side of the loader.

A rear baggage container stop 229 (FIG. 13B) is associated with the roller conveyor 44 on the left side of the machine. This stop comprises a bell crank 231 having a rubber bumper 232 on one leg, and a container-positioning switch actuator 233 rigidly secured to its pivot bolt 234. The rear container stop 229 is secured on the bolt 234 which is journaled in a sleeve 235 secured to the channel frame 227. A spring 236 is connected between a bolt 237 secured to the channel frame 227 and a bolt 238 secured in the other leg 239 of the bell crank 231. The spring 236 normally holds the rear baggage container stop 229 in the position shown in FIG. 13B wherein the leg 239 abuts the end of the channel frame 227 thereby holding the rubber bumper 232 above the level of the roller 226. Thus, when a container C is supported on the roller conveyors 44 the bumper 232 is disposed adjacent a transversely extending flange 241 (FIG. 13B) on the box-like base 225 of the container C to prevent the container from rolling off the right end of the loader 30.

As shown in FIG. 3, the rubber bumper 232 is in longitudinal alignment with the rollers 226 while the switch actuator 233 is spaced laterally of the rollers out of the path of the container. If the switch actuator 233 is in the position shown in FIG. 2, it indicates that, during the upward movement of the roller conveyors 44 to lift the container C from the trailer T, the baggage container C was properly transferred and is properly positioned on the elevating mechanism 46. However, if the baggage container C is not in proper alignment when the conveyors are elevated, the rubber bumper 232 will engage the underside of the base flange 241 of the container C and the switch actuator 233 will be pivoted clockwise (FIG. 4) to contact and open a container positioning switch SW1 which is positioned on the frame adjacent the actuator 233 when the conveyors are in their lower position. The elevating mechanism 46 will then become inoperative until the container C is manually repositioned on the elevating mechanism 46.

A forward baggage container stop 246 (FIG. 13A) comprises a stop shoe 247 which is pivotally mounted on a pin 248 secured to the channel 227. The lower end of the shoe 247 extends through a slot 249 in the channel 227 and in the structural member 228 and, when in the locked position, is held in abutting engagement against the rear edge of the slot 249 by a spring 251. A link 256 pivotally connects the shoe 247 to a bell crank 252 which is pivoted about a pin 253 that is mounted in an inverted channel extension 254 secured to the forward end of the left roller conveyor 44. With the parts disposed in the locking position shown in FIGS. 4 and 13A, a transverse flange 257 (FIG. 2) which extends transversely across the box-like base 225 of the container C will be in position to contact the portion of the stop shoe 247 (FIG. 13A) that projects above the level of the roller. This position of the shoe 247 is maintained by the spring 251 until the roller conveyor is moved upwardly into engagement with the associated roller conveyor 42 of the bridge assembly 43.

When the left conveyor 44 is moved upwardly to the position shown in FIG. 2, an adjustable actuating pin 258 (FIG. 13A) in the end of the bell crank 252 engages a guide channel 259 (FIG. 4) on the rear end of the associated bridge conveyor 42. As the inverted channel extension 254 nests in the inverted channel 259, the pin 258 engages the top wall of channel 259 and is depressed, causing the bell crank 252 (FIG. 13A) to pivot the stop shoe 247 to a position below the path of movement of the base flange 257 of the container C. The container may then be manually transferred from the conveyor 44 to the bridge assembly 43.

In order to handle baggage containers of different widths, the right and left roller conveyors 44 are each provided with a carrier fence 261 (FIGS. 3, 10, 13A, 13B and 14). Each fence 261 is mounted on two identical adjustment assemblies 262 which permit transverse adjustment of the fence 261. Each assembly 262 (FIG. 14) includes a vertical plate 263 welded to the Z-shaped structural member 228 of one of the conveyors 44. The vertical plate 263 is provided with spaced notches 264 and 266 in its upper end. A pad 267 is welded to the member 228 and slidably supports a channel bracket 268 to which one end of the fence 261 is welded. A shouldered cap screw 269 extends through a slot 270 in the bracket 268 and is screwed into a threaded hole (not shown) in the pad 267. A plate 271, having two holes therein, is welded to the upper edges of the channel bracket 268 and slidably receives the legs 272 and 273 of a U-shaped latch 274 in the holes. The leg 273 is also slidably received in a collar 276 welded to the bracket 268. A spring 277 is guided by the leg 273 and is disposed between the plate 271 and a washer 278 supported by a pin 279 which extends through the leg 273. As is apparent from FIG. 14, the spring 276, acting between the washer 278 and the plate 271, urges the lower end of the leg 273 into one of the notches 264 and 266 to lock the fence 261 in adjusted position. When it is desired to adjust the fences 261, the operator merely lifts both U-shaped latches 274 associated with one of the fences to pull the lower ends of the legs out of the notches 264 or 266. The operator then moves the fence transversely so that the lower ends of the legs 273, when released, will enter the other of the two notches 264 or 266. The fence 261 on the other side of the machine is adjusted in the same manner.

The roller conveyor 44 on the right side of the baggage loader 31 is substantially the same as the above described left conveyor 44. The right conveyor, however, does not have a forward baggage container stop, and does not have a container positioning switch actuator on the rear container stop. The right roller conveyor 44 has a stationary rubber roll 281 (FIG. 3) immediately adjacent the right rear baggage container stop 229. The rubber roll 281 frictionally engages the base of the baggage container and prevents it from rolling freely between the forward and rear stops while the elevating mechanism 46 is raising or lowering the container.

As has already been mentioned, the carrier 30 is provided with a generally three point rolling suspension, i.e., the carrier is supported by the two closely spaced drive wheels 79 (FIG. 3) which are disposed near the transverse center of the engine compartment 34 and by caster wheels 81 and 82 disposed at the rear of the right leg 57 and left leg 58, respectively. The left caster wheel 81 (FIG. 15) is journalled on a shaft 286 which is secured to a yoke 287 which is pivoted by a pin 288 to a caster body 289. A spring 291, disposed between the yoke 287 and the body 289, urges the caster wheel 81 to pivot in a clockwise direction about the pin 288. The amount of pivotal movement is limited by a pin 292 in the yoke which rides in slots 293 (only one being shown) in the body 289. The body 289 is connected to a mounting plate 294 for free pivotal movement about a vertical axis by any suitable pivotal connector 296.

The plate 294 is bolted to a mating plate 297 welded to the lower end of a tubular shank 298 of square cross-section. The tubular shank 298 is the movable portion of screw jack 299 which includes a fixed body 301 of square cross-section which extends through an opening in the leg 58 and within which the shank 298 is slidably received. A mounting plate 302 is welded to the body 301 and is bolted to the upper apertured wall of the left leg 58. An adjustment screw 303 is rotatably received in an apertured cap 304 of the body 301. The adjustment screw 303 includes an enlarged head 306 having a forked upper end 307. A crank 308 is pivotally connected to the forked end 307 of the screw 303 by a bolt 309 so that the crank, when turned by the operator, will cause rotation of the screw 303. The crank 308 may also be positioned closely adjacent the body 301 upon rotation about the axis of the bolt 309. A collar 311 is secured to the screw 303 by a pin 312. The collar 311 and enlarged head 306 cooperate with the cap 304 to prevent lateral movement of the screw.

Normally, the jack 299 is positioned so that the distance between the bottom of the caster wheel 81 and the top of the leg 58 is the same as the distance between the bottom of the caster wheel 82 (FIG. 17) and the top of the leg 57 thereby holding the carrier level with its supporting surface. If, however, the aircraft floor is inclined fore and aft and it is desirable to raise or lower the leg 58 (FIG. 3) more than three inches so as to place the plane of the supporting surfaces of the right and left elevator conveyors 44 in a position substantially parallel to an inclined line running longitudinally through the floor 39 of the aircraft A, the jack 299 is employed to make such correction. This condition may occur if one of the caster wheels is disposed in a hole when the loader is in loading position or in the evnt the aircraft is in a nose high or nose low attitude. It will be understood, however, that the baggage loader will operate satisfactorily when the elevation of the leg 58 is as much as 3″ above or below the desired elevation.

The steereable caster wheel 82 (FIG. 17) is mounted to the rear end of the leg 57. The assembly which supports the caster wheel 82 is similar to that which supports the wheel 81 except that the body 289a is rigidly secured to the plate 294a. The plate 294a is bolted to a plate 316 welded to the end of a vertical shaft 317 journalled in bearings 318 and 319 secured to the frame structure. A sprocket 321 is keyed to the upper end of the shaft 317 and has an ear 322 welded on the lower surface thereof. A spring 323 (FIGS. 16 and 17), which is connected to the ear 322 and to an ear 324 secured to the frame, urges the caster wheel 82 to maintain a straight forward driving position.

A steering wheel shaft 326 (FIG. 16) is journalled in the frame structure and has a sprocket 327 keyed near the lower end thereof and a steering wheel 328 keyed on the upper end thereof. A chain 329 is trained around idler sprockets 331 and 332 journalled on the frame structure and around the sprockets 321 and 327. Thus, it will be apparent that if the carrier is moving toward the left (FIG. 3) and the steering wheel 328 is turned in a clockwise direction, the rear end of the carrier 30 will shift to the left causing the carrier to make a right turn, while turning the steering wheel 328 in the opposite direction will cause the loader to make a left turn.

As shown in FIGS. 3 and 16, a guard rail 333 is mounted around the outer and rear edges of an operator's platform 334 adjacent the steering wheel 328. The rail 333 is substantially waist high. A pedal 336 is provided as the actuator of a switch SW2 which is effective to control the forward and reverse speed of the carrier 30.

The carrier 30 cannot be connected to the aircraft A until the adaptor 32 (FIGS. 2, 4 and 18) is locked to the floor 37 of the aircraft. The adaptor 32 (FIG. 18) comprises end supports 338 and 339 secured in spaced parallel relation by non-rotatable transverse rods 341, 342 and 343. The previously described V-shaped guides 73 are welded to the rear edges of the supports 338 and 339. Two Z-shaped brackets 344 are rigidly secured to the rod 342 and have rollers 347 journalled in the upper portions thereof. A ball connector 348 is bolted to the rearward extension of each bracket 344 and a tie rod 349 interconnects the two brackets 344. Two resilient pads 351 are secured to the rod 341 and engage the skin of the aircraft A as shown in FIGS. 2 and 4. Each bracket 344 has a pin 352 (FIGS. 2, 4 and 21) rigidly connected thereto, and each of the two pins 352 is received in a socket 353 (FIGS. 2 and 21) formed in the floor 37 of the aircraft A.

In order to lock the adaptor 32 on the aircraft A, an adaptor lock 354 (FIGS. 4, 18, and 19) is provided which includes a pivot bracket 356 rigidly connected to a short cylindrical member 355 that is fixed to and projects outwardly from a central portion of the transverse rod 342. An arm 357, which is disposed between the two spaced plates of bracket 356 and is pivotally connected thereto by a pin 358, is movable from the locked position shown in solid lines in FIG. 19 to the unlocked position shown in dotted lines. A nut 359 welded to the free end of the arm 357 receives a threaded rod 361 which has a resilient locking pad 362 rigidly mounted on its upper end. A locknut 363 locks the rod 361 in desired position on the arm 357. A bifurcated actuating lever 364 extends on opposite sides of and is pivoted to the bracket 356 by a pin 366. The actuating lever 364 is pivotally connected to the arm 357 by a link 367 and pivot pins 368 and 369. A stop 371 formed on the link 367 engages the arm 357 when the arm is in the locked position, and a tab 372 formed integrally with the pivot bracket 356 is engaged by the actuating lever 364 when the lever is in the full open position as shown in phantom lines in FIG. 19.

Thus, to mount the adaptor 32 on the aircraft A, the operator manually places the adaptor 32 in the position shown in FIG. 4 with the pins 352 disposed in their associated sockets 353 in the floor 37 of the aircraft A and with the pads 351 engaging the airplane. The operator then pushes the actuating lever 364 from the phantom line position to the solid line position shown in FIG. 19 to lock the pad 362 (FIG. 4) against the skin of the aircraft. Thus the floor 37 is clamped between the upper ledges of the two Z-shaped brackets 344 and the central pad 362.

A container stop 374 (FIGS. 18, 20, 21 and 22) is provided in order to prevent a baggage container already in the aircraft from being pushed out of the aircraft when the roller conveyors 42 of the bridge assembly 43 are in the inclined position as shown in FIG. 4, i.e., when the elevator conveyors 44 are disposed below the level of the floor 37 of the aircraft A.

The stop 374 is enclosed within a fabricated housing 376 (FIGS. 18 and 20) which is of welded construction and includes vertical side walls 377 and 378, a rear wall 379, a top 381 and an inclined end wall 382 (FIG. 22) with a locking shoe stop 383 at the upper end thereof. The housing 376 is connected to the left bracket 344 (FIG. 18) of the adaptor 32 by cap screws 384 (FIG. 20). A locking shoe 386 is pivotally mounted on a bolt 387 secured to the housing 376 and has a resilient pad 388 on its lower end which engages the stop 383 when the shoe is in a locking position with an upper edge projecting above the level of the rollers 347 (FIG. 21) of the bracket 344. An actuating lever 389 (FIG. 22) is pivotally mounted in the housing 376 by a bolt 391 and has an abutment arm 392 welded thereto and projecting laterally outward therefrom through a slot 393 (FIG. 18) in the side wall 377. A link 394 (FIG. 22) is pivotally connected between the shoe 386 and the lever 389 by pins 396 and 397. A spring 398 is connected between the pin 397 and the inclined end wall 382 and normally holds the shoe 386 in the locking position shown in FIGS. 18, 21 and 22.

The shoe 386 is moved to an unlocked position, i.e., a position below the supporting surface of the rollers 347 by movement of the left bridge conveyor 42 to a level position. For this purpose, a tab 399 (FIG. 21) is welded to the channel frame 401 of the left bridge conveyor 43 overlying the abutment arm 392.

An adjustment screw 402 is locked to the tab 399 by nuts 403. It is apparent, therefore, that, when the bridge is inclined as shown in FIG. 21, the screw 402 is spaced from the abutment arm 392 and the stop 374 is in its raised position. Upon pivotal movement of the bridge conveyor 42 about the ball connector 348 to the position of FIG. 2, the screw 402 will contact the abutment arm 392 and pivot the shoe 386 to a position below the level of the supporting surfaces of the rollers 347 thus permitting movement of containers into or out of the aircraft.

Both bridge conveyors 42 are substantially the same, therefore, the description of the left conveyor will suffice for both. The left bridge conveyor 42 (FIGS. 4, 21 and 23) comprises the previously mentioned channel frame 401 which supports a plurality of rollers 406 for free rotation. A guide plate 407 (FIG. 20) is secured to the outer edge of the channel frame 401 and projects above the upper level of the rollers to engage the side of each baggage container and guide it as it is moved over the bridge.

As shown in FIG. 21, the forward end of the conveyor 42 is pivotally connected to the ball connector 348. A housing 408 having a substantially hemispherical forward end 409 is welded to the lower surface of the channel frame 401 and is placed over the ball 348. A lever 411 which is pivoted about a pin 412 secured to the housing 408, has its forward end shaped as a spherical segment which cooperates with the hemispherical forward end 409 to grip the ball 348 when the parts are positioned as shown in FIG. 21. A threaded rod 413, having a nut 414 on the lower end, extends through openings in the lever 411 in the upper wall of the housing 408, in the channel frame 401 and in a wear plate 416 which is welded to the housing 408. Springs 417 and 418 are disposed between the nut 414 and the lever 411, and between the lever 411 and the upper wall of the housing 408, respectively. A camming lever 419 (FIGS. 20 and 21) is pivotally connected to the rod 413 by a pin 421 and includes two identical camming elements 422 which straddle the rod 413. A T-shaped latch 423 is pivotally supported on the lever 419 by a pin 424 and is urged to pivot in a counterclockwise direction (FIG. 21) by a spring 426 so that an end of the latch 423 will be received and maintained in locking engagement with a notch 427 in the upper end of the rod 413.

The operator presses downwardly on the right end of the T-shaped latch 423 when he wants to disconnect the left bridge conveyor 42 from the ball 348. This action causes the T-shaped latch 423 to become disengaged from the notch 427 so that the operator can easily swing the lever 419 in a counterclockwise direction, permitting spring 418 to move the rod 413 downwardly and permitting the free end of the lever 411 to swing away from the ball 348. The forward end of the conveyor 42 is then lifted free from the ball 348. When it is desired to lock the left bridge conveyor 42 on the ball 348, the operator merely pivots the lever 419 clockwise (FIG. 21) causing the camming surfaces 422 to raise the rod 413. When the latch 423 engages the wall of the notch 427, the bridge conveyor 42 is pivotally connected to the left ball 348.

As best shown in FIG. 23, the inverted channel 259 on the rear end of the left bridge conveyor 42 rests in cut-outs 429 formed in an angle bracket 431 on the left side of the alignment assembly 66. When the left conveyor 44 (FIG. 4) of the elevating mechanism 46 is disposed below the bridge conveyor 42, the rear end of the bridge conveyor 42 is held in the cut-outs 429 by a spring 432 connected between the bridge conveyor 42 and the alignment assembly 66. When the left bridge conveyor 44 is not connected to the ball 348, it is stowed on the alignment assembly 66 with the channel 259 supported in the cut-outs 429 of the angle bracket 431, and the conveyor moved rearwardly on the assembly 66 until the flanged end 433 of the housing 408 is disposed rearwardly of a stop 434 of the assembly 66 in position to depress the actuating element of a normally open bridge stowage switch SW3. As will be explained presently, the switch SW3 is in the circuit of the motor which propels the carrier so that the switch SW3 must be closed, evidencing the correct positioning of the bridge, before the carrier can be moved.

The above described parts associated with the left bridge conveyor 42 are duplicated for the right bridge conveyor, also assigned numeral 42, which parts will not be described in detail. It should be understood, however, that only one bridge stowage switch SW3 is provided and that this switch is associated with the left conveyor 42. It is also to be noted that a level bridge mercury switch SW4 (FIG. 4) is mounted only on the left bridge conveyor 42, and that this switch is open when the bridge conveyor is level and closed when the bridge conveyor is inclined.

As has been mentioned previously, before the baggage elevating mechanism 46 (FIG. 4) can be operated, the two locking feet 38 of the hydraulic locking system 41 must be actuated to immobilize the carrier 30. The two locking feet 38, one disposed adjacent the caster wheel 81

(FIG. 3) and the other being disposed adjacent the caster wheel 82, are best illustrated with the hydraulic locking system 41 in FIG. 24.

The hydraulic locking system 41 includes the feet 38 which are connected to pistons 441 and 442 of hydraulic cylinders 443 and 444. The pistons 441 and 442 are normally held in inactive positions away from the surface, which supports the loader, by springs 446 and 447, respectively.

The pistons 441 and 442 are activated by a hand pump 448, the suction end of which communicates with a reservoir 449. The pressure end of the pump 448 is connected by a conduit 451 to a manifold 452. Conduits 453 and 454 are connected between the manifold and check valves 456 and 457, respectively, which permit the flow of fluid only in the direction of the arrows inscribed thereon. An elongated pressure conduit 458 communicates with the check valve 456 and the cylinder 443, while a shorter pressure conduit 459 communicates with the check valve 457 and the cylinder 444. Check valves 461 and 462 communicate with the pressure conduits 458 and 459 respectively, and with a dump valve 463 through a conduit 464. A return conduit 466 is connected between the dump valve 463 and the reservoir 449, and a pressure relief valve 467, set at 500 p.s.i., is connected between the manifold 452 and the return conduit 466 by a conduit 468 so that, if the pressure in the manifold 452 reaches 500 p.s.i., the relief valve 467 will open and return the fluid to the reservoir 449. A two position ground lock pressure switch SW5 is connected to the elongated pressure conduit 458 and has electrical contacts arranged to be moved to a position which permits operation of the elevating mechanism 46 only when the pressure in the conduit 458 is above that necessary to immobilize the loader. Thus, the elevating mechanism 46 cannot be actuated unless the loader is first immobilized.

After the loader 30 has been driven to the loading position, the operator makes certain that the dump valve 463 (FIG. 24) is closed and then manually actuates the pump 448. Hydraulic fluid then flows under equal pressure through the conduit 451, manifold 452, conduits 453 and 454, check valves 456 and 457, and conduits 458 and 459 into the cylinders 443 and 444. Since equal locking pressure is applied to both pistons 441 and 442, the feet 38 will support the loader 30 in the same attitude in which it had been supported by the casters 81 and 82 (FIG. 3) even though one foot may travel further than the other. After a sufficient pressure has been applied to the pistons 441 and 442 (FIG. 24) to immobilize the loader 30 and to close the pressure switch SW5, the baggage loader is ready for the transfer of baggage containers C into the aircraft or for receiving containers from the aircraft. It will be noted that even though the weight is not centered in the baggage container C and causes a greater proportion of the load to be applied to one side of the loader than the other, the four check valves will cooperate to prevent fluid from flowing from one cylinder to the other. Thus, the loader will remain in its preset attitude while the baggage containers are being loaded or unloaded from the aircraft.

After the loading operation has been completed, the dump valve 463 is opened and the springs 446 and 447 cause the pistons 441 and 442 to raise, forcing the displaced fluid through the several conduits, through the dump valve 463, and through the return conduit 466 into the reservoir 449. This flow of fluid reduces the pressure on the switch SW5 and causes a contact of the switch to open.

Since the operation of the baggage loader 29 is subject to close electrical controls, the electrical control circuit 475 shown in FIG. 25 and the operation of the loader 29 will be described simultaneously. In order to facilitate the understanding of the control circuit of FIG. 25, some of the elements of the circuit will be located hereinafter with reference to index "lines" 1–31 marked on the main conductor 482 of the circuit. The position in the machine of the several switches and their actuators employed in the control circuit 475 will first be described.

The normally closed container switch SW1 (FIG. 4) is mounted on the left leg of the carrier 30 in position to be actuated by the switch actuator 233 if a container is positioned on the rubber bumper 232 thereby causing the actuator to be pivoted to the right of the position shown in FIG. 4.

The pedal switch SW2 is located on the carrier at the operator's station (FIG. 3) as previously mentioned.

The bridge stowage switch SW3 is mounted on the alignment assembly 66 and the level bridge mercury switch SW4 (FIG. 4) is mounted on the bridge conveyor 42. The contacts of stowage switch SW3 are normally open, but closed as seen in line 21 of FIG. 25 when the bridge conveyor is in stowage position on the carrier. The normally closed contacts of the mercury switch SW4 are opened when the bridge conveyor 42 is raised to horizontal or level position.

The ground-lock pressure switch SW5, which is shown only in FIG. 24 and on line 25 of FIG. 25, is located in the engine compartment 34 (FIG. 4). This switch SW5 is arranged to prepare a propulsion circuit so that the loader may be moved when no pressure is applied, and is arranged, when closed by hydraulic pressure in the conduit 458 leading to the locking cylinder 443, to partially prepare a circuit which permits operation of the elevating mechanism 46 after the carrier is anchored in place.

A normally closed lower limit switch SW6 (FIG. 4) is mounted on the left leg 58 of the carrier, and a normally closed upper limit switch SW7 is mounted on a bracket connected to the top of the left rear column 59D. These limit switches SW6 and SW7 are actuated by arms 479 and 481, respectively, on the left elevator conveyor 44, to limit the downward and upward movement of the elevating mechanism 46.

Other manually operated switches SW8, SW9 and SW10, which will be described presently, are shown only in the control diagram of FIGURE 25. It will suffice to mention that these switches and certain power lights are mounted within easy reach of the operator either in a panel adjacent the steering wheel or in a panel on the left rear portion of the carrier 30.

The engine 86 (FIG. 5) is provided with the usual engine controls (not shown). When the engine is started, it drives the generator and supplies 28 volt direct current to main lines 482 and 483 (FIG. 25). A light switch SW8 (line 5) having a contactor 486 closes a circuit to two headlights 487 when the contactor 486 engages a contact 488. The head light circuit includes the main line 482, a lead 489, the contactor 486, a lead 491, the headlights 487, a lead 492, and a lead 493 to the main line 483. A circiut is established to two floodlights 494 (line 6) when the contactor 486 is moved into engagement with the contact 496. The floodlight circuit includes the main line 482, the lead 489, the contactor 486, a lead 497, the floodlights 494, a lead 498, and the lead 493 to the main line 483.

When the engine 86 and generator 88 are operating to supply 28 volt D.C. current to the control circuit 475, a pair of power lights 501 and 502 (line 31) are glowing. One of the lights is disposed in a control panel near the steering wheel 328 (FIG. 3) while the other is in a panel on the left side of the carrier. The circuit to the power lights 501 and 502 (FIG. 25) includes the main line 482, leads 503 and 504, the lights 501 and 502 and a lead 505 to the main line 483.

Before the carrier 30 may be driven, the hydraulic pressure acting on the ground lock pressure switch SW5 (line 25) must be relieved so that the contactor 506 thereof engages a contact 507. The bridge conveyor 42 also must be in stowage position on the carrier so that it closes the bridge stowage switch SW3 (line 21) causing its contactor 508 to close against a contact 509.

To drive the carrier 30 forward, the contactor 511 of the forward-reverse toggle switch SW9 (line 20) is moved into a forward position against a contact 513. The operator then depresses the pedal 336 thereby actuating switch SW2 to close certain ones of contactors 514, 516, 517 and 518 (line 15). If the slowest speed of 0.76 m.p.h. is desired, the pedal 336 is depressed only far enough to close the contactor 514. If a speed of 1.42 m.p.h. is desired, the pedal is depressed far enough to close contactors 514 and 516. If a speed of 1.96 m.p.h. is desired, the pedal is depressed far enough to close the contactors 514, 516 and 517, and, if the fastest speed of 3.16 m.p.h. is desired, the pedal is depressed far enough to close the four contactors 514, 516, 517 and 518.

Assuming that the operator wishes to drive the loader at its lowest speed of 0.76 m.p.h., the pedal 336 is depressed only far enough to close the contactor 514 of switch SW2. Power then flows from the main line 482 through the lead 503, a lead 519, the contactor 506 of the ground lock pressure switch SW5, a lead 521, the contactor 508 of the bridge stowage switch SW3, leads 522, 523, 524 and 526, the contactor 514, a lead 527, the coil of a relay S in line 7, and to the main line 483. The energization of relay S closes contactors S1 (line 18), S2 (line 20), S3 (line 29) and opens contactor S4 (line 30). Closing of contactor S1 causes current to flow from the main line 482 through the portion of the circuit just described to the lead 523, through a lead 528, through the closed contactor S1, through a lead 529, and through the coil of a relay M (line 23) to the main line 483. Energization of relay M closes a contactor M1 (line 1) in the motor circuit to partially prepare this circuit.

Closing of relay contactor S2 (line 20) causes current to flow from the main line 482, through the leads 503, 519, the contactor 506 of the switch SW5, the lead 521, the contactor 508 of switch SW3, the lead 522, the contactor S2 of relay S, the contactor 511 of the toggle switch SW9, a lead 531, and through the coil of a lower control relay L to the main line 483. The lower control relay L is mechanically interlocked with a raise control relay R, thus, energization of the relay L assures deenergization of the relay R. Energization of relay L closes contactors L1 and L2 in the motor circuit.

Closing of the relay contactor S3 (line 29) establishes a circuit which bypasses a propulsion brake resistor 580 which is in series with the elevator clutch 106. However, the simultaneous opening of the contactor S4 opens the circuit to the magnetic elevator clutch 106 thus releasing the elevator clutch.

The elevator brake 109 (line 19) locks the elevator in fixed position at this time since current flows from the main line 482, through leads 503, 519 and to the main line 483 through a lead 532 which has a closed contactor B4 of a brake relay B and the brake 109 therein. It will be noted that the propulsion clutch 93 is energized by a flow of current through the circuit which includes the main line 482, the leads 503 and 519, the contactor 506 of switch SW5, the lead 521, the contactor 508 of the switch SW3, the leads 522, 523 and 524, a lead 534 and through the propulsion clutch 93 (line 16) to the main line 483. A variable resistor 536 is provided in the circuit of the propulsion clutch 93 so as to adjust the torque requirement of the clutch to the desired level. Accordingly, if the resistor is adjusted so that more resistance is introduced into the circuit, the torque transmitted by the clutch will be reduced.

With the different parts of the electrical control circuit 475 in the low speed position as above described, the carrier 30 is driven forward at 0.76 m.p.h. Current flows through the series field to the armature of the motor 89 (line 4) from the main line 482, through a lead 537, through the closed contactor M1, through a lead 538, through the series field 539, through closed contactor L1, through a lead 541, through three speed control resistors 542, 543, and 544, and through a lead 547 to the armature of the motor 89. Current also flows through the motor's shunt field 548 (line 1) from the main line 482, through the lead 537, the contactor M1, the lead 538, the shunt field 548, and a lead 549 to the main line 483. Power flows to the armature of the motor 89 from the main line 483 through the lead 549, through the closed contactor L2 and through a lead 551 to the armature of the motor 89. Thus, the motor 89 and propulsion clutch 93 are energized to drive the baggage loader 30 forward at the slowest speed of 0.76 mile per hour.

If the operator wishes to drive forward at the second speed of 1.42 m.p.h., he depresses the pedal 336 far enough to close contactors 514 and 516 of switch SW2. Closing of contactor 516 energizes a speed control relay X (line 11) which receives power from the lead 526, a lead 553, the contactor 516, a lead 554, the coil of relay X, and leads 556, 557 and 558 to main line 483. Energizing relay X closes the relay contactor X1 which bypasses the resistor 542 in the motor series field by establishing a circuit from the lead 541, through a lead 559 and through the closed contactor X1 to the resistor 543.

If a speed of 1.96 m.p.h. is desired, the operator depresses the pedal 336 to a position which closes the contactors 514, 516 and 517 of SW2. This action causes current to flow through the leads 526, 553, a lead 561, the contactor 517, a lead 562, the coil of a speed control relay Y (line 11), and the leads 557 and 558 to the main line 483. Energization of relay Y closes relay contactor Y1 (line 10), thereby bypassing the speed control resistors 542 and 543 by closing a circuit in the series field of the motor 89 which includes the leads 541, 559, a lead 563, the contactor Y1, the resistor 544, and the lead 547 to the armature of the motor 89.

Similarly, if the high speed of 3.16 m.p.h. is desired, the pedal 336 is depressed far enough to close the four contactors 514, 516, 517 and 518. This establishes a circuit which includes the leads 526, 553, 561, a lead 564, the contactor 518, a lead 566, the normally closed contactor B3 of a relay B, the coil of a speed control relay Z, and the lead 558 to the main line 483. Energization of the relay Z closes the contactor Z1 which bypasses the three resistors 542, 543 and 544 in the series field of the motor 89. The bypass circuit includes leads 541, 559, 563, a lead 567, the closed contactor Z1, and the lead 547 to the armature of the motor.

It is to be understood that the specific speeds stated herein are given only as an example and may be changed by proper control of the resistors 542, 543 and 544.

If it is desired to drive the carrier 30 in a reverse direction, the actuator 511 of the toggle switch SW9 is placed in its reversed position in contact with a contact 571. Current then flows from the main line 482, through the leads 503, 519, the contactor 506, the lead 521, the contactor 508, the lead 522, the closed contactor S2 of relay S, the actuator 511 of toggle switch SW9, leads 572 and 573, and the coil of the relay R to the main line 483. Energization of relay R closes contactors R1 (line 3) and R2 (line 2) in the motor circuit. The mechanical interlock between relay R and relay L and the disengagement of the toggle switch contactor 511 from contact 513 deenergizes relay L and opens contactors L1 and L2 in the motor circuit. Consequently, the direction of current flowing to the armature of the motor 89 is reversed, and accordingly, the direction of rotation of the motor is reversed. In this regard, current flows from the series field 539, through a lead 574, the closed contactor R2, a lead 576 and the lead 551 to the armature of the motor 89. Current also flows from the main line 483, through a lead 577, the closed contactor R1, a lead 578, the lead 541, the resistors 542, 543, and 544, or any of the previously described bypassing circuits depending upon the desired speed, and through the lead 547 to the armature of the motor 89. In this way, the carrier is driven in reverse.

At the beginning of a cargo loading operation, the carrier 30 is driven at any one of the above speeds to a point immediately adjacent the cargo opening 31 of the aircraft A. The operator then lifts the adaptor 32 from its storage position on the housing 33 of the engine compartment 34 and mounts it on the aircraft A. The operator makes sure that the pins 352 are seated in the sockets 353 and then positively locks the adaptor 32 in position by moving the actuating lever 364 (FIG. 19) of the adaptor lock 354 to the solid line position of FIG. 19 thereby forcing the locking pad 362 (FIG. 4) against the skin of the aircraft A.

With the adaptor 32 locked in place on the aircraft A, the operator aligns the carrier 30 with the cargo opening 31 by driving the loader forward until both bumpers 72 firmly engage the associated V-shaped guides 73 of the alignment assembly 66.

As mentioned previously, the electro-magnetic elevator brake 109 (FIG. 25), is energized to lock the shafts of the gear box 108 in fixed position when the contactor 506 of the ground engaging switch SW5 engages the contact 507. Releasing of the pedal 336 effects opening of the circuit to the coil of relay S (line 7), thereby closing relay contactor S4 (line 30) and opening contactor S3 (line 29). Current then flows from the main line 482, through leads 503, 519, a lead 579, an elevator clutch brake resistor 580 in series with the elevator clutch 106, the closed contactor S4 of relay S, a lead 581, a variable resistor 582 which cooperates with the resistor 580 to control the driving torque of the elevator clutch 106, and through the elevator clutch 106 to the main line 483 thus completing the circuit. By adding the elevator clutch brake resistance 580 to the variable resistance 582, the holding power of the clutch 106 is reduced so that controlled slippage will occur within the clutch 106, and hence, between the shafts of the gear box 108 which are locked by the elevator brake 109 and the motor shaft which is connected to the drive wheels 79 through the propulsion clutch 93. Thus, the elevator clutch 106 is used as a brake to gently stop the forward or reverse movement of the carrier and hold the carrier in stationary position.

The above described brake will hold the carrier against the alignment assembly 66 allowing the operator to adjust the rear end of the carrier by means of the jack 299 (FIG. 15) which raises or lowers the caster wheel 81. Normally, however, no vertical adjustment of the wheel 81 is required. The operator then rigidly fixes the carrier in position by operating the manual pump 448 of the hydraulic locking system 41 (FIG. 24) to force the feet 38 downwardly to fix both the attitude and the position of the carrier 30. When the feet 38 are locked in position, the pressure in the system 41 is sufficient to actuate the ground lock pressure switch SW5 causing its contactor 506 in line 25 (FIG. 25) to break with the contact 507 and engage a contact 584. Current then flows from the main line 482, through leads 503, 519, the contactor 506 of the ground lock pressure switch SW5, leads 586 and 587, and a ground lock indicator light 588 to the main line 483. The indicator light 588 is mounted on the control panel near the rear end of the left leg 58. Upon this actuation of the ground lock pressure switch SW5, the several propulsion circuits are broken, and the elevator circuits are partially prepared.

The operator then pushes the trailer T with the container C thereon into the carrier 30 until the forward end of the trailer T engages the bumpers 63 (FIG. 3). The sides of the trailer are guided by the guide rails 64 during movement into the carrier. It will be understood that feet (not shown) on the baggage container C are received in positioning slots 589 in the supporting surface 47 of the trailer T when the container C is in proper position on the trailer T. Thus, the positioning of the trailer T against the bumpers 63 (FIG. 3) properly locates the container C relative to the roller conveyors 44 of the elevating mechanism 46 which elevators are, at this time, positioned below the surface 47 of the trailer T.

The operator then moves the bridge conveyors 42 (FIG. 4) from their stowage position (not shown) wherein the bridge stowage switch SW3 is held open by the flange 433, to the operating position wherein the forward ends of the conveyors 42 are pivotally connected to the associated balls 348 as indicated in FIGURE 21. The stowage switch SW3 then moves to its normally closed position, and the level bridge mercury switch SW4 likewise moves to a closed position because of the inclination of the bridge conveyor 42. The normally closed upper limit switch SW7 is closed and the lower limit switch SW6 is open because the elevator conveyors 44 are in their lowermost positions and the arm 479 is in engagement with the actuating element of the switch SW6.

The raise-lower toggle switch SW10 in line 24 (FIG. 25) is actuated to the "raise" position which causes the mechanically interlocked contactors 592 and 593 of the switch SW10 to engage the contacts 594 and 596, respectively. Current then flows from main line 482, through leads 503, 519, the contactor 506 of the ground lock pressure switch SW5, the lead 586, a lead 597, the contactor 592, a lead 598, the closed upper limit switch SW7, a lead 599, the closed level bridge switch SW4, a lead 601, the closed container positioning switch SW1, the lead 573, and the coil of the relay R to the main line 483. Energization of relay R closes contactors R1 and R2 in the motor circuit, and the mechanical interlock between relay R and relay L assuring that the contactors L1 and L2 are open. Current also flows from the lead 573, through a lead 602, through the actuator 593 of the toggle switch SW10, through leads 603 and 604, and through the coil of a relay B to the main line 483. Energization of relay B closes contactors B1, B2 and B5, and opens contactors B3 and B4.

Closing of the contactor B1 causes current to flow from the lead 603, through the closed contactor B1, and through the coil of relay M to the main line 483. Energization of relay M closes contactor M1 in the motor circuit.

The closing of contactor B2 and the opening of contactor B3 breaks the circuit controlled by the pedal 336 and closes a circuit from the line 603, which includes the closed contactor B2, a lead 606, the coil of the speed control relay Z, and the lead 558 which is connected to the main line 483. It will therefore be seen that actuation of the toggle switch SW10 to the raised position will cause the motor 89 to be driven at its highest speed in the previously established forward direction. Opening the contactor B4 in the lead 532 opens the circuit to the magnetic brake coil 109. Closing of contactor B5 bypasses the brake resistance 580, thereby restoring full torque capacity to the elevator clutch 106, and closes a circuit to the elevator clutch 106 as follows. Current flows from the main line 482, through the leads 503, 519, 579, the closed contactor B5, the closed contactor S4, a lead 581, the elevator clutch resistor 582, and the clutch 106 to the main line 483.

With the toggle switch SW10 held in the raised position, the elevator conveyor will move upwardly under the baggage container C and carry the same upwardly. If the baggage container is not positioned forward of the rear baggage container stop 229 (FIG. 4) and, accordingly, rests on the bumper 232, the arm 233 will contact and open the container positioning switch SW1 thus breaking the circuit. Repositioning of the container so that it is positioned forward of the rear baggage container stop 229 permitting the actuator 233 to return to the position shown in FIG. 4, effects closing of the raise circuit. The elevator conveyors will then move upwardly with the baggage container thereon until the bridge conveyors 42 are contacted by the forward ends of the elevator conveyors 44 and are moved to a horizontal position thereby opening the level bridge mercury switch SW4 and breaking the circuit. Normally the level bridge switch SW4 will effect automatic opening of the raise circuit, however, if the rear ends of the bridge conveyors 42 are placed out of the path of movement of the forward ends of the elevator conveyors 44, the conveyors 44 may be moved upwardly until the arm 481 contacts and opens the upper limit switch SW7 thereby opening the circuit.

It will be noted that immediately upon opening of the raise circuit (when the baggage container is in the position shown in FIGURE 2) by any of the above switches, that the brake 109 is energized and the motor 89 is stopped since the relays R, B and M are deenergized and their contactors return to the positions shown in FIGURE 25. The baggage container elevating mechanism is thus locked in the position shown in FIGURE 2 with the supporting surfaces of floor 37 of the aircraft A, the bridge conveyors 42 and the elevator conveyors 44 all at a common level.

Since the pin 258 (FIG. 4) of the forward baggage stop 246 is moved downwardly by engagement with the guide channel 259 of the left bridge conveyor 42, the stop shoe 247 is moved to the unlocked position below the level of the container supporting surfaces. Similarly, the aircraft baggage container stop 374 is moved downwardly below the level of the baggage container. The operator then manually pushes the container off the rubber friction roller 281 (FIG. 3) and into the aircraft upon the rotatable balls 51 on the aircraft floor 37. Aircraft personnel then push the container forward or aft of the aircraft away from the cargo opening 31 so that other containers can be loaded into or unloaded from the aircraft.

If a baggage container C is to be unloaded from the aircraft A, it is merely pushed out of the aircraft onto the bridge conveyors 42 and from the bridge conveyors onto the elevator conveyors 44. The container C is prevented from moving off the rear end of the loader C by engagement with the rear baggage container stops 229.

In order to lower the elevating mechanism 46 with or without a container thereon, the toggle switch SW10 (line 24) is moved to the "lower" position thereby engaging the contactors 592 and 593 with contacts 611 and 612, respectively. Current then flows from main line 482, through the leads 503, 519, the contactor 506 of the ground lock pressure switch SW5, the leads 586 and 597, the contactor 592 of the toggle switch SW10, a lead 613, the closed lower limit switch SW6, a lead 614, and through the coil of relay L to the main line 483. Energization of relay L closes relay contactors L1 and L2 in the motor circuit and assures opening of the contactors R1 and R2. Current also flows from the lead 614, through a lead 616, the contactor 593, the leads 603 and 604 and through the coil of the relay B to the main line 483. Energization of relay B establishes the same circuits as have been described above in reference to the "raise" circuits, the only difference being that the closing of contactors L1 and L2 and opening of contactors R1 and R2 directs the current to the armature of the motor 89 in the opposite direction. Thus, the motor is driven in a reverse direction thereby causing controlled lowering of the elevating mechanism 46.

An empty trailer T positioned against the bumpers 63 (FIG. 3) receives the baggage container C from the elevator conveyors 44 as they move downwardly therepast. Downward movement of the conveyor can be stopped at any time by releasing the toggle switch SW10; however, downward movement is normally stopped when the lower limit switch SW6 (FIG. 4) is contacted and opened by the arm 479. When in this lower position, the rear baggage container stops 229 are disposed below the baggage container so that the trailer T with the container thereon can be pulled away from the baggage loader and returned to the terminal building.

Before the carrier 30 can be driven away from the aircraft A, the bridge conveyors 42 must be disconnected from the adaptor 32 and moved to their stowage positions on the alignment assembly 66 with the flange 433 of the left bridge conveyor 42 resting on the actuating element of the bridge stowage switch SW3 to close the switch. Also, the hydraulic pressure must be relieved from the ground lock pressure switch SW5 (FIG. 25) so that the actuator 506 engages the contact 507. The carrier is then placed in reverse and backed a short distance away from the aircraft A. The adaptor 32 is removed from the aircraft A and placed in its stowage position on the housing 33 of the engine compartment 34. The loading and unloading operation is then complete and the mobile, self-propelled baggage loader 29 is driven away from the aircraft.

From the foregoing description, it is apparent that the mobile baggage loader of the present invention operates efficiently and rapidly. The apparatus is easily aligned with the aircraft's cargo opening by sliding engagement between the alignment assembly 66 (FIG. 2) and the adaptor 32, and is connected thereto by the free-floating action of the bridge conveyor 42 in such a way that no adverse effects will occur if the aircraft's height or attitude is changed due to wind gusts or weight being added to or removed from the aircraft while the frame of the carrier is rigidly locked on the ground. The loader is also arranged to load or unload several containers into the aircraft while the frame on the carrier is locked in fixed position. The attitude of the carrier is also preset and the carrier is arranged to handle baggage containers having weight loads which are not evenly distributed therein without altering the preset attitude of the carrier. Mechanical and electrical protective devices are provided on the carrier which minimize the possibility of injury to operating personnel or damage to the carrier in the event of careless handling of the baggage containers or of the different controls of the loader.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. A baggage handling apparatus for loading baggage into and unloading baggage from the floor of an aircraft having a cargo opening comprising, an adaptor arranged to be connected to the aircraft and aligned in the cargo opening substantially at the level of the aircraft floor, a mobile carrier movable into abutting engagement with said adaptor, an elevator on said carrier for raising a container to a position in which the bottom of the container is slightly above the level of the floor of the aircraft, a bridge for connecting the adaptor to said elevator, means pivotally connecting one end of said bridge to said adaptor, and means supporting the other end of said bridge on said carrier for unrestricted longitudinal movement relative to said carrier in all pivoted positions of said bridge and in the path of upward movement of said elevator for engagement and movement thereby to the elevation of the floor of the aircraft, the unrestricted movement of said bridge relative to said carrier permitting movement of said bridge relative to said carrier incident to movement of the aircraft when said bridge is at the elevation of the aircraft floor.

2. A baggage handling apparatus for loading baggage into and unloading baggage from the floor of an aircraft having a cargo opening comprising, an adaptor arranged to be connected to the aircraft and aligned in the cargo opening substantially at the level of the aircraft floor, a mobile carrier, an alignment assembly on said carrier, a resilient bumper secured to said assembly and movable forwardly into abutting engagement with said adaptor upon forward movement of said carrier for terminating the forward movement of said carrier and positioning the carrier in a predetermined location relative to the aircraft an elevator on said carrier for raising a container to a position in which the bottom of the container is slightly above the level of the floor of the aircraft, a bridge for connecting the adaptor to said elevator means, and means pivotally connecting one end of said bridge to said adaptor and position the other end in the path of upward movement of said elevator for engagement and movement thereby to the elevation of the floor of the aircraft, said elevator and said bridge means having rollers for supporting and conveying the container as it is moved between the carrier and the aircraft.

3. A baggage handling apparatus for loading baggage into and unloading baggage from the floor of an aircraft having a cargo opening comprising, an adaptor arranged to be connected to the aircraft and aligned in the cargo opening substantially at the level of the aircraft floor, a mobile carrier movable into abutting engagement with said adaptor, an elevator for raising a container to a position in which the bottom of the container is slightly above the level of the floor of the aircraft, a bridge for connecting the adaptor to said elevator, means pivotally connecting one end of said bridge to said adaptor and positioning the other end in the path of upward movement of said elevator for engagement and movement thereby to the elevation of the floor of the aircraft, power means for raising said elevator, and control means connected to said power means and including means for automatically terminating the upward movement of said elevator when said other end of said bridge means is moved to the level of the floor of the aircraft.

4. A baggage handling apparatus for loading baggage into and unloading baggage from the floor of an aircraft having a cargo opening comprising, an adaptor arranged to be connected to the aircraft and aligned in the cargo opening substantially at the level of the aircraft floor, a mobile carrier movable into abutting engagement with said adaptor, an elevator for raising a container to a position in which the bottom of the container is slightly above the level of the floor of the aircraft, a bridge for connecting the adaptor to said elevator, means pivotally connecting one end of said bridge to said adaptor and positioning the other end in the path of upward movement of said elevator for engagement and movement thereby to a loading and unloading position at the level of the floor of the aircraft, said elevator and said bridge having container-supporting rollers, power means for moving said carrier, control means connected to said power means for immobilizing said mobile carrier when said carrier is disposed in said loading and unloading position, second power means for actuating said elevator, and means connected to said second power means for controlling the actuation of said elevator and permitting operation of said elevator only after said carrier has been immobilized.

5. A baggage handling apparatus for loading baggage into and unloading baggage from the floor of an aircraft having a cargo opening comprising, an adaptor connected to the aircraft and aligned with the cargo opening substantially at the level of the aircraft floor, a mobile carrier having an elevator support structure and a bumper projecting a predetermined distance forwardly from said structure and movable into abutting engagement with said adaptor to space said structure a predetermined distance from said aircraft, said carrier having a U-shaped body, means in said structure for elevating a container to a position in which the bottom of the container is slightly above the level of the floor of the aircraft, and bridge means having one end pivotally connected to said adaptor and having its other end disposed in the path of upward movement of said elevating means for engagement and movement by said elevating means to the level of the floor of the aircraft to cooperate with said adaptor to form a container-support surface extending between the aircraft and said container-elevating means.

6. A baggage handling apparatus for loading baggage into and unloading baggage from the floor of an aircraft having a cargo opening comprising, an adaptor connected to the aircraft and aligned with the cargo opening substantially at the level of the aircraft floor, a mobile carrier, an alignment assembly on said carrier, a resilient bumper secured to said assembly and movable forwardly into abutting engagement with said adaptor upon forward movement of said carrier for terminating the forward movement of said carrier and for positioning the carrier in a predetermined location relative to the aircraft, said carrier having a U-shaped body including a bight section and two legs extending rearwardly therefrom, a wheel journalled in said bight section adjacent the transverse midpoint thereof, a rear wheel mounted for rotation near the rear end of each leg, means on said carrier for elevating a container to a position in which the bottom of the container is slightly above the level of the floor of the aircraft, bridge means having one end pivotally connected to said adaptor and having its other end disposed in the path of upward movement of said elevating means for engagement and movement by said elevating means to the elevation of the floor of the aircraft, and means for vertically adjusting one of said rear wheels to accommodate the carrier to uneven terrain and to inclined positions of the floor of the aircraft.

7. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, a mobile self-propelled carrier movable into abutting engagement with said adaptor and having a U-shaped body including a bight section and two legs extending rearwardly therefrom, a drive wheel journalled in said bight section adjacent the transverse midpoint thereof, a steerable wheel mounted for rotation near the rear end of one of said legs, a free swinging caster wheel mounted for rotation near the rear end of the other of said legs, means for elevating a container to a position in which the bottom of the container is slightly above the level of the floor of the aircraft and including a container support surface, bridge means having one end pivotally connected to said adaptor and having its other end disposed in the path of upward movement of said elevating means for engagement and movement by said elevating means to the elevation of the floor of the aircraft, and means connected to said free swinging caster wheel to adjust the same vertically to preset the inclination of the container support surface of said elevating means to correspond to the inclination of the floor of the aircraft.

8. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, a mobile self-propelled carrier movable into abutting engagement with said adaptor and having a U-shaped body including a bight section and two legs extending rearwardly therefrom, a drive wheel journalled in said bight section adjacent the transverse midpoint thereof, a steerable wheel mounted for rotation near the rear end of one of said legs, a free swinging caster wheel mounted for rotation near the rear end of the other of said legs, means for elevating a container to a position in which the bottom of the container is slightly above the level of the floor of the aircraft and including a container-support surface, bridge means having one end pivotally connected to said adaptor and having its other end disposed in the path of upward movement of said elevating means for engagement and movement by said elevating means to the elevation of the floor of the aircraft, means connected to said free swinging caster wheel to adjust the same vertically to preset the inclination of said container supporting surface to correspond to the inclination of the floor of the aircraft, and locking means connected to said carrier for immobilizing said carrier and for locking said carrier in said preset attitude during handling of the container.

9. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, a mobile carrier movable into abutting engagement with said adaptor and having a U-shaped body defined by a bight section and a pair of rearwardly extending legs, means including a pair of spaced elevator roller conveyors for elevating a container positioned within said U-shaped body, each of said roller conveyors being disposed adjacent one of said legs, and bridge means including a pair of spaced bridge roller conveyors, each of said bridge conveyors being pivotally connected at one end to said adaptor and having its other end supported on said carrier for unrestricted longitudinal movement relative thereto in all pivoted positions of said bridge conveyor and disposed in the path of upward movement of one of said elevator conveyors for engagement and movement thereby to a position in which the container supporting surfaces of said bridge rollers are at the elevation of the floor of the aircraft.

10. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, a mobile carrier movable into abutting engagement with said adaptor and having a U-shaped body defined by a bight section and a pair of rearwardly extending legs, means including a pair of vertically movable spaced roller conveyors for elevating a container positioned within said U-shaped body, each of said roller conveyors being disposed adjacent one of said legs, bridge means including a pair of spaced bridge roller conveyors, each of said bridge conveyors being pivotally connected at one end to said adaptor and having its other end disposed in the path of upward movement of one of said elevator conveyors for engagement and movement thereby to the elevation of the floor of the aircraft, and two independent container stop means, one stop means being carried by one of said elevator conveyors and the other stop means being carried by said adaptor for preventing the movement of a container between said elevating means and the aircraft when said elevator conveyors are spaced from said bridge conveyors, both of said independent container stop means being operably associated with said bridge means to be actuated thereby incident to upward movement thereof to a position in which the container-supporting surfaces of said bridge conveyors are substantially level with the floor of the aircraft to permit a container to be moved over said bridge conveyors toward or away from the aircraft.

11. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, a mobile carrier movable into abutting engagement with said adaptor and having a U-shaped body defined by a bight section and a pair of rearwardly extending legs, means including a pair of spaced elevator roller conveyors for elevating a container positioned within said U-shaped body, each of said roller conveyors being disposed adjacent one of said legs, a container guide fence disposed adjacent each of said roller conveyors, means for adjusting said fences transversely of said elevator conveyor so as to handle containers of different width, and bridge means including a pair of spaced bridge roller conveyors, each of said bridge conveyors being pivotally connected at one end to said adaptor and having its other end disposed in the path of upward movement of one of said elevator conveyors for engagement and movement thereby to a position in which the container supporting surfaces of said bridge conveyors are substantially at the elevation of the floor of the aircraft, the engagement between said other end of each of said bridge conveyors and the associated elevator conveyor being effective to permit limited lateral movement of said bridge conveyor relative to said associated elevator conveyor.

12. A baggage handling apparatus for loading baggage into and unloading baggage from the floor of an aircraft having a cargo opening comprising, an adaptor adapted to be connected to the aircraft and aligned with the cargo opening substantially at the level of the aircraft floor, alignment means on said adaptor, a mobile carrier movable into abutting engagement with said alignment means, a pair of spaced bridge conveyors having their forward ends pivotally connected to said adaptor and having their rear ends inclined downwardly, means on said mobile carrier for supporting the rear ends of said bridge conveyors in said inclined position, a pair of spaced elevator conveyors on said mobile carrier, means for raising and lowering said elevator conveyors, and means on the forward ends of said elevator conveyors for engaging and lifting the rear ends of said bridge conveyors from said support means, upon upward movement of the elevator conveyors, and moving said bridge conveyors to a position in which the container supporting surfaces of said bridge conveyors are substantially level with the floor of the aircraft, said engagement between each of said bridge conveyors and the associated elevator conveyor being effective to permit unrestricted longitudinal movement and limited lateral movement of said bridge conveyor relative to said elevator conveyor.

13. A baggage handling apparatus for loading baggage into and unloading baggage from the floor of an aircraft having a cargo opening comprising, an adaptor arranged to be connected to the aircraft and aligned with the cargo opening substantially at the level of the aircraft floor, alignment means on said adaptor, a mobile carrier movable into abutting engagement with said alignment means, a pair of spaced bridge conveyors having their forward ends pivotally connected to said adaptor and having their rear ends inclined downwardly, means on said mobile carrier for supporting the rear ends of said bridge conveyors in said inclined position, a pair of spaced elevator conveyors on said mobile carrier, means for raising and lowering said elevator conveyors, means on the forward ends of said elevator conveyors for engaging and lifting the rear ends of said bridge conveyors from said support means to a position that is level with the floor of the aircraft upon upward movement of the elevator conveyors, and means for vertically adjusting one side of said carrier for presetting the attitude of the carrier transversely so that the container-supporting surfaces of said elevator conveyors are substantially parallel to the floor of the aircraft measured longitudinally of the aircraft.

14. A baggage handling apparatus for loading baggage into and unloading baggage from the floor of aircraft having a cargo opening comprising, an adaptor adapted to be connected to the aircraft and aligned with the cargo opening substantially at the level of the aircraft floor, alignment means on said adaptor, a self-propelled mobile carrier movable into engagement with said alignment means, a pair of spaced bridge conveyors having their forward ends pivotally connected to said adaptor and having their rear ends inclined downwardly, means on said mobile carrier for supporting the rear ends of said bridge conveyors, a pair of spaced elevator conveyors on said mobile carrier, means for raising and lowering said elevator conveyors, means on the forward ends of said elevator conveyors for engaging and lifting the rear ends of said bridge conveyors from said support means to a position that is level with the floor of the aircraft upon upward movement of the elevator conveyor, means for vertically adjusting one side of said carrier for presetting the attitude of the carrier transversely so that the container-supporting surfaces of said elevator conveyors are substantially parallel to the floor of the aircraft, and means on said carrier for locking said carrier in said preset attitude and in fixed position.

15. In apparatus for loading baggage onto and unloading baggage from the floor of an aircraft having a cargo opening, an adaptor connected to the aircraft and aligned with the cargo opening, alignment means on said adaptor including a vertically disposed groove, a self-propelled mobile carrier, and a vertically adjustable alignment assembly on said mobile carrier having a resilient member adapted to be inserted in said groove to align said carrier with said cargo opening.

16. A baggage handling apparatus for loading baggage into and unloading baggage from the floor of an aircraft having a cargo opening comprising, an adaptor arranged to be connected to the aircraft and having a container-supporting surface, alignment means on said adaptor, a self-propelled mobile carrier movable into abutting engagement with said alignment means, an elevator on said carrier movable to a container transfer position in which the lower surface of a container on said elevator is at the level of the support surface of said adaptor, a container stop pivotally mounted in said adaptor and having an end portion arranged to be moved from a position below the container-support surface of said adaptor to a position in the path of movement of a container moving over said adaptor to engage the container and prevent movement thereof out of the plane, and means on said carrier for engaging and pivoting said container stop and moving it to a position below the level of the support surface of said adaptor as said elevator approaches said container transfer position as said elevator.

17. A baggage handling apparatus for loading baggage into and unloading baggage from the floor of an aircraft having a cargo opening, said apparatus comprising an adaptor arranged to be clamped to the aircraft and aligned with the cargo opening, alignment means on said adaptor, a self-propelled mobile carrier movable into abutting engagement with said alignment means, a pair of spaced bridge conveyors having their forward ends pivotally connected to said adaptor and having their rear ends inclined downwardly, means on said mobile carrier for supporting the rear ends of said bridge conveyors, a pair of spaced elevator conveyors on said mobile carrier, a rear baggage container stop on one of said elevator conveyors for engaging a container carried by said elevator conveyors and limiting its movement toward the rear of said elevator conveyors, a forward baggage container stop pivotally mounted on one side of said elevator conveyors and disposed in position to limit the forward movement of the container when said elevator conveyors are spaced from said bridge conveyors, means for raising and lowering said elevator conveyors, means on the forward ends of said elevator conveyors for engaging and lifting the rear ends of said bridge conveyors from said support means during upward movement of said elevator conveyors to move said bridge conveyors to a position in which the container support surfaces of said bridge conveyors are level with the floor of the aircraft, and actuating means carried by said one elevator conveyor and connected to said forward container stop, said actuating means being disposed in position to contact and be actuated by the rear end of one of said bridge conveyor upon upward movement of said elevator conveyors to pivot said forward stop out of the path of movement of the container.

18. A baggage handling apparatus for loading baggage into and unloading baggage from the floor of an aircraft having a cargo opening, said apparatus comprising an adaptor arranged to be clamped to the aircraft and aligned with the cargo opening, alignment means on said adaptor, a self propelled mobile carrier movable into abutting engagement with said alignment means, a pair of spaced bridge conveyors having their forward ends pivotally connected to said adaptor and having their rear ends inclined downwardly, means on said mobile carrier for supporting the rear ends of said bridge conveyors, an aircraft container stop connected to said adaptor and disposed in position to contact a container in the aircraft and prevent movement thereof out of the cargo opening when said bridge conveyors are in the inclined position, a pair of spaced elevator conveyors on said mobile carrier, a rear baggage container stop on one of said elevator conveyors for engaging a container carried by said elevator conveyors and limiting its movement toward the rear of said elevator conveyors, a forward baggage container stop pivotally mounted on one of said elevator conveyors and disposed in position to limit the forward movement of a container on the elevator conveyor when said elevator conveyors are spaced from said bridge conveyors, means for raising and lowering said elevator, means on the forward ends of said elevator conveyors for engaging and lifting the rear ends of said bridge from said support means during upward movement of said elevator conveyors to move said bridge conveyors to a position in which the container support surfaces of said bridge conveyors are level with the floor of the aircraft actuating means carried by said one elevator and connected to said forward container stop, said actuating means being disposed in position to contact and be actuated by the rear end of one of said bridge conveyors upon upward movement of said elevator conveyors to pivot said forward stop out of the path of movement of the container, and means carried by one of said bridge conveyors for engaging said aircraft container stop and moving said stop out of the path of the container when said bridge conveyors assume said loading position.

19. In a baggage handling apparatus the combination of an adaptor arranged to be clamped to an aircraft, a ball connection secured to said adaptor, a mobile carrier movable into abutting and vertically slidable engagement with said adaptor, an elevator on said carrier and movable in a vertical path, a bridge conveyor connected at one end to said ball connector for universal pivotal movement and having its other end disposed in the path of movement of said elevator, and drive means on said carrier and connected to said elevator for moving said elevator upwardly into engagement with said other end of said bridge conveyor to slidably engage and lift said other end to the level of said one end.

20. In a baggage handling apparatus the combination of an adaptor arranged to be clamped to an aircraft, a mobile carrier movable into abutting and vertically slidable engagement with said adaptor, an elevator on said carrier and movable in a vertical path, a bridge conveyor connected at one end to said adaptor for universal pivotal movement and having its other end disposed in the path of movement of said elevator, and power means on said carrier connected to said elevator for moving said elevator upwardly into engagement with said other end of said bridge conveyor to slidably engage and support said other end for pivotal movement, said adaptor being movable vertically relative to said carrier incidental to vertical movement of the aircraft while said carrier is engaged with said adaptor.

21. In a baggage loader, a carrier, an alignment assembly on said carrier, means for adjusting said alignment assembly vertically to adapt the loader for operation with aircraft having cargo doors at different heights, means for locking said alignment assembly in adjusted position, a resilient bumper on the forward end of said alignment assembly, an adaptor connected to the aircraft being loaded and aligned in the cargo opening thereof, vertically elongated guide means on said adaptor, and means for moving said carrier forwardly for causing said bumper to engage said guide means to align said carrier with said cargo opening.

22. In a baggage loader adapted to load baggage into aircraft cargo openings which openings are located at different heights above the aircraft supporting surface, the combination of an adaptor connected to the aircraft being loaded and aligned in the cargo opening thereof, a pair of spaced vertically elongated guide channels on said adaptor and opening rearwardly thereof, a carrier, an alignment assembly on the forward end of said carrier, means on said carrier for adjusting said alignment assembly vertically to position the alignment assembly at the elevation of said adaptor, a pair of spaced resilient bumpers on the forward end of said alignment assembly, and means for moving said carreir forwardly for causing said bumper to engage said guide means to align said carrier with said cargo opening.

23. A baggage handling apparatus for loading baggage into and unloading baggage from the floor of an aircraft having a cargo opening comprising, an adaptor arranged to be connected to the aircraft and aligned in the cargo opening substantially at the level of the aircraft floor; a mobile carrier movable into abutting engagement with said adaptor and having a U-shaped horizontal body; an elevator including a drive shaft on said body for raising a container to a position in which the bottom of the container is slightly above the level of the floor of the aircraft; said elevator including a drive sprocket on said shaft, a driven sprocket journalled on said carrier, a chain trained around said sprockets, and resilient means connected between the ends of said chain for automatically compensating for chain wear to maintain said chain in firm driving engagement with said sprockets; a bridge for connecting said adaptor to said elevator; means pivotally connecting one end of said bridge to said adaptor and positioning the other end in the path of upward movement of said elevator for engagement and movement thereby to a loading and unloading position at the level of the floor of the aircraft; said elevator and said bridge having container-supporting rollers; power means for moving said carrier; control means connected to said power means for immobilizing said mobile carrier when said carrier is disposed in said loading and unloading position; second power means for actuating said elevator; flexible drive means included in said second power means and trained around said elevator drive shaft; automatic brake means operatively connected between said flexible drive means and said shaft for maintaining said shaft in an unlocked position when said flexible drive means is in shaft-driving position and for locking said shaft in fixed position in the event breakage should occur in said flexible drive means; and means connected to said second power means for controlling the actuation of said elevator and permitting operation of said elevator only after said carrier has been immobilized.

References Cited in the file of this patent
UNITED STATES PATENTS

| | | |
|---|---|---|
| 1,601,971 | Knapp | Oct. 5, 1926 |
| 1,931,484 | Bosserdet et al. | Oct. 24, 1933 |
| 1,996,523 | Pferfer et al. | Apr. 2, 1935 |
| 2,379,094 | Maxon | June 26, 1945 |
| 2,545,696 | Harvuot | Mar. 20, 1951 |
| 2,620,932 | Alpine | Dec. 9, 1952 |
| 2,685,374 | Croston | Aug. 3, 1954 |
| 2,713,432 | Lorimer | July 19, 1955 |
| 2,792,079 | Gibson | May 14, 1957 |
| 2,875,852 | Morrell | Mar. 3, 1959 |